(12) United States Patent
Semlani

(10) Patent No.: US 10,853,440 B2
(45) Date of Patent: Dec. 1, 2020

(54) DISPLAYING AN OBJECT HAVING A LINK TO A DATABASE RECORD IN RESPONSE TO A USER SELECTION OF A HIGHLIGHTED REFERENCE

(71) Applicant: salesforce.com, inc., San Francisco, CA (US)

(72) Inventor: Latesh Semlani, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 75 days.

(21) Appl. No.: 15/627,059

(22) Filed: Jun. 19, 2017

(65) Prior Publication Data
US 2018/0365334 A1 Dec. 20, 2018

(51) Int. Cl.
| | | |
|---|---|---|
| G06F 21/00 | (2013.01) | |
| G06F 7/04 | (2006.01) | |
| G06F 21/62 | (2013.01) | |
| G06F 16/957 | (2019.01) | |
| H04L 29/06 | (2006.01) | |
| G06Q 10/10 | (2012.01) | |
| H04L 29/08 | (2006.01) | |
| G06F 40/134 | (2020.01) | |
| G06F 40/205 | (2020.01) | |
| G06F 40/295 | (2020.01) | |
| G06F 3/0482 | (2013.01) | |

(Continued)

(52) U.S. Cl.
CPC ........ *G06F 16/9574* (2019.01); *G06F 16/957* (2019.01); *G06F 40/134* (2020.01); *G06F 40/205* (2020.01); *G06F 40/295* (2020.01); *G06Q 10/10* (2013.01); *H04L 63/08* (2013.01); *H04L 67/02* (2013.01); *H04L 67/141* (2013.01); *H04L 67/20* (2013.01); *G06F 3/0482* (2013.01); *G06F 16/951* (2019.01); *G06F 16/9558* (2019.01); *G06F 16/9577* (2019.01); *H04L 63/083* (2013.01)

(58) Field of Classification Search
CPC .............................. H04L 63/08; G06F 17/278
USPC ............................................................ 726/3
See application file for complete search history.

(56) References Cited

U.S. PATENT DOCUMENTS 5,577,188 A 11/1996 Zhu
5,608,872 A 3/1997 Schwartz
(Continued)

OTHER PUBLICATIONS

U.S. Appl. No. 13/986,251, filed Apr. 16, 2013.

*Primary Examiner* — Haresh N Patel
(74) *Attorney, Agent, or Firm* — Dergosits & Noah LLP; Todd A. Noah

(57) ABSTRACT

A method for enhanced web browsing includes displaying additional information associated with potential leads referenced within the web content of web page. The method generally includes receiving, by an executable application associated with a web browser on a computer system, contents of a web page to be displayed by the web browser and parsing the content to identify one or more references to at least one potential lead, such as a business entity. The executable application then determines whether the at least one potential lead is associated with a record stored in a database, and displays the contents of the web page on the browser with the references highlighted and linked to the corresponding record in the database. Upon selecting the highlighted reference, an object comprising the information from the record in the database is displayed in the web browser.

19 Claims, 14 Drawing Sheets

(51) Int. Cl.
*G06F 16/951* (2019.01)
*G06F 16/955* (2019.01)

(56) References Cited

U.S. PATENT DOCUMENTS

| | | | |
|---|---|---|---|
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,340,411 | B2 | 3/2008 | Cook |
| 7,356,482 | B2 | 4/2008 | Frankland et al. |
| 7,401,094 | B1 | 7/2008 | Kesler |
| 7,620,655 | B2 | 11/2009 | Larsson |
| 7,698,160 | B2 | 4/2010 | Beaven et al. |
| 7,779,475 | B2 | 8/2010 | Jakobson et al. |
| 7,851,004 | B2 | 12/2010 | Hirao et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,209,308 | B2 | 6/2012 | Jakobson et al. |
| 8,275,836 | B2 | 9/2012 | Beaven et al. |
| 8,380,512 | B2* | 2/2013 | Bonforte ........... G06F 17/30755 704/270 |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 9,734,257 | B2* | 8/2017 | Weber .................. G06F 16/958 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0091762 | A1* | 7/2002 | Sohn .................... G06F 3/0481 709/203 |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2009/0063415 | A1 | 3/2009 | Chatfield et al. |
| 2009/0100342 | A1 | 4/2009 | Jakobson |
| 2009/0177744 | A1 | 7/2009 | Marlow et al. |
| 2009/0299802 | A1* | 12/2009 | Brennan ................ G06Q 10/06 705/7.36 |
| 2010/0057618 | A1* | 3/2010 | Spicer ................ G06F 3/04815 705/64 |
| 2011/0196866 | A1* | 8/2011 | Cooper ............. G06F 17/30595 707/737 |
| 2012/0131645 | A1* | 5/2012 | Harm .................. G06F 21/6218 726/4 |
| 2012/0190432 | A1 | 7/2012 | Nathanson |
| 2012/0191735 | A1 | 7/2012 | Duff et al. |
| 2012/0233137 | A1 | 9/2012 | Jakobson et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0282749 | A1* | 10/2013 | Batraski ........... G06F 17/30864 707/767 |

(56) References Cited

U.S. PATENT DOCUMENTS

| | | | |
|---|---|---|---|
| 2014/0181290 A1* | 6/2014 | Wong | H04L 63/10 709/224 |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0100594 A1* | 4/2015 | Hess | G06Q 10/10 707/755 |
| 2015/0120712 A1* | 4/2015 | Yi | G06F 17/30053 707/723 |
| 2015/0172563 A1 | 6/2015 | Jakobson et al. | |
| 2015/0189347 A1 | 7/2015 | Oztaskent et al. | |
| 2015/0242439 A1 | 8/2015 | Freedman et al. | |
| 2015/0254246 A1* | 9/2015 | Sheth | G06F 17/3053 707/728 |
| 2017/0249701 A1* | 8/2017 | Pabrai | G06Q 40/06 707/755 |

* cited by examiner

FIG. 5 https://www.salesforce.com/company/news-press/press-releases/2017/05/170524.jsp

PRODUCTS   SOLUTIONS   SERVICES   SUPPORT   EVENTS   CUSTOMERS   ABOUT US

CONNECT TO YOUR CUSTOMERS IN A WHOLE NEW WAY    QUESTIONS? 1-800-667-6389    CONTACT US >    LOGIN

Press and News
› Press Releases

Salesforce Announces Strategic Agreement with Dell Technologies

Salesforce's Intelligent Customer Success Platform to connect Dell Technologies' sales, service, marketing and more Salesforce Einstein artificial intelligence to make customer interactions smarter and more predictive Share/tag this page
- Twitter
- Facebook
- Digg
- del.icio.us
- Submit this story SAN FRANCISCO—May 24, 2017—Salesforce (NYSE: CRM), the

On-Demand Database Information

| COUNTRY | INDUSTRY | NAME | # OF EMPLOYEES | REVENUE | WEBSITE |
|---------|----------|------|----------------|---------|---------|
| USA | Other | Salesforce.com Inc | 265,321 | 0 | Salesforce.com |
| USA | Other | Salesforce.com Inc | 265,321 | 0 | Salesforce.com |
| USA | Other | Salesforce.com Inc | 265,321 | 0 | Salesforce.com |
| USA | Other | Salesforce.com Inc | 265,321 | 0 | Salesforce.com |
| USA | Retail | SalesForce Won Ltd | 65,456 | 0 | Salesforce.com |

802 — receiving, by an executable application associated with a web browser on a computer system, a user selection of a reference to a business entity included within contents of a web page being displayed by the web browser during a user browsing session;

804 — causing, by the executable application, an object to be displayed by the web browser in response to the user selection of the reference to the business entity, the object including at least some information associated with the business entity retrieved from a third-party information source 806 — transmitting, by the executable application, instructions to store the at least some information associated with the business entity retrieved from the third-party information source to an on-demand database in response to a user input.

```
                    ┌─────────────────────────────────────────────────────┐
                    │ receiving, by an executable application associated  │
                    │ with a web browser on a computer system, a user     │
                    │ selection of a reference to a business entity       │── 1102
                    │ included within contents of a web page being        │
                    │ displayed by the web browser during a user          │
                    │ browsing session                                    │
                    └─────────────────────────────────────────────────────┘
                                             │
                                             ▼
                    ┌─────────────────────────────────────────────────────┐
                    │ determining, by the executable application, whether │
                    │ the business entity is associated with at least one │── 1104
                    │ record stored in an on-demand database in response  │
                    │ to the user selection of the reference to the       │
                    │ business entity;                                    │
                    └─────────────────────────────────────────────────────┘
                                             │
                                             ▼
                    ┌─────────────────────────────────────────────────────┐
                    │ causing, by the executable application, a first     │
                    │ object to be displayed by the web browser in        │
                    │ response to a determination that the at least one   │
                    │ business entity is associated with the at least one │── 1106
                    │ record, the object including at least some          │
                    │ information about the at least one business entity  │
                    │ associated with the at least one record, the object │
                    │ further including a link to the at least one record │
                    └─────────────────────────────────────────────────────┘
                                             │
                                             ▼
                    ┌─────────────────────────────────────────────────────┐
                    │ causing, by the executable application, a second    │
                    │ object to be displayed by the web browser in        │
                    │ response to a determination that the at least one   │── 1108
                    │ business entity is not associated with the at least │
                    │ one record, the second object including at least    │
                    │ some information associated with the business       │
                    │ entity retrieved from a third-party information     │
                    │ source                                              │
                    └─────────────────────────────────────────────────────┘
```

FIG. 11

DISPLAYING AN OBJECT HAVING A LINK TO A DATABASE RECORD IN RESPONSE TO A USER SELECTION OF A HIGHLIGHTED REFERENCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to web browsing, and more specifically enhancing web browsing, by providing additional on-demand information associated with the content of the web page being displayed by a web browser.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In marketing, lead generation is a process of stimulating and capturing interest of business entities, products or services for the purpose of developing a sales pipeline. To develop leads, employees often use a variety of resources to gather information about companies, businesses, or contacts, including checking newspaper articles and following trade journals. For example, reading local newspapers and trade journals provides vital information on different company developments and new technology. This information can be used for direct marketing to specific companies.

In recent years, digital platforms have become the preferred choice for obtaining such information. For example, the number of people that read news articles or journal articles on their laptops or on their computers has increased exponentially in the past decade. Additionally, online news resources, blogs and journals provide real-time articles on current and new company developments and new technologies.

However, with the abundance of information readily available online, a concern is making meaningful use of the information provided by website content. For example, while browsing through articles on various web pages, an employee of a company may come across a particular article that provides vital information on a potential lead, such as a particular company announcing a new development. The employee may want to gather more information on the particular company and/or determine if the particular company was already stored as a lead within a database.

Conventionally, upon reading the article on the web page, the employee would have to connect and log into the employee's customer relationship management (CRM) database, and search the database to identify if the company within the article is already stored as a lead in the CRM database. Additionally, if the employee determines that the company is not stored as a lead in the CRM database, the employee would have to open a new web page and use a search engine to obtain more information. This process of obtaining additional information is time consuming and cumbersome. Currently, technology does not exist that allows a web browsing user to determine if a potential lead is stored in a database, such as a CRM database, or obtain additional information about the potential lead in a time-efficient and convenient manner.

BRIEF SUMMARY

The disclosed embodiment includes methods for enhanced web browsing, whereby additional information associated with potential leads referenced in web content of a web page displayed by a web browser is provided in an on-demand manner within the web browser. The method generally includes receiving, by an executable application associated with a web browser on a computer system, contents of a web page to be displayed by the web browser. The received content of the web page is then parsed by the executable application to identify one or more references to at least one potential lead, such as a business entity. A determination is made by the executable application as to whether the at least one potential lead is associated with at least one record stored in a database. When a determination is made that the at least one potential lead is associated with at least one record stored in the database, the executable application displays the contents of the web page on the browser with the identified one or more references highlighted and linked to the at least one record in the database. A user may then select the one or more highlighted references. Once the user selects the one or more highlighted references, an object is displayed on the web browser, wherein the object includes at least some information about the potential lead associated with the at least one record, the object further including a link to the at least one record.

The disclosed embodiments may further include an apparatus for performing authentication, and include a processor, and one or more stored sequences of instructions which, when executed by the processor, cause the processor to receive, by an executable application associated with a web browser on a computer system, contents of a web page to be displayed by the web browser; parse, by the executable application, the contents of the web page to identify one or more references to at least one business entity; determine, by the executable application, whether the at least one business entity is associated with at least one record stored in a database; cause, by the executable application, based on a determination that the at least one business entity is associated with the at least one record, the contents of the web page to be displayed by the browser with the one or more references highlighted and linked to the at least one record in the database; and cause, by the executable application, an object to be displayed by the web browser in response to a user selection of the one or more highlighted references, the object including at least some information about the at least one business entity associated with the at least one record, the object further including a link to the at least one record.

The disclosed embodiments may also include a computer program product comprising computer-readable program code to be executed by one or more processors when retrieved from a non-transitory computer-readable medium, the program code including instructions to receive, by an executable application associated with a web browser on a computer system, contents of a web page to be displayed by the web browser; parse, by the executable application, the contents of the web page to identify one or more references to at least one business entity; determine, by the executable application, whether the at least one business entity is associated with at least one record stored in a database; cause, by the executable application, based on a determination that the at least one business entity is associated with the at least one record, the contents of the web page to be displayed by the browser with the one or more references highlighted and linked to the at least one record in the database; and cause, by the executable application, an object to be displayed by the web browser in response to a user selection of the one or more highlighted references, the object including at least some information about the at least one business entity associated with the at least one record, the object further including a link to the at least one record.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIG. 5 shows a screenshot of an example web page after having the executable application applied to the example web page, in accordance with some embodiments such as shown in FIG. 4.

FIG. 7 shows a screenshot of an example web page after having the executable application applied to the example web page, in accordance with some embodiments such as shown in FIG. 6.

FIG. 8 shows a flow chart diagram illustrating a method of providing additional on-demand information associated with content displayed on a web page, in accordance with some embodiments.

FIGS. 9-10 show a screenshot of an example web page after having the executable application applied to the example web page, in accordance with some embodiments such as shown in FIG. 8.

FIG. 11 shows a flow chart diagram illustrating a method of providing additional on-demand information associated with content displayed on a web page, in accordance with some embodiments.

DETAILED DESCRIPTION

Figure 1:
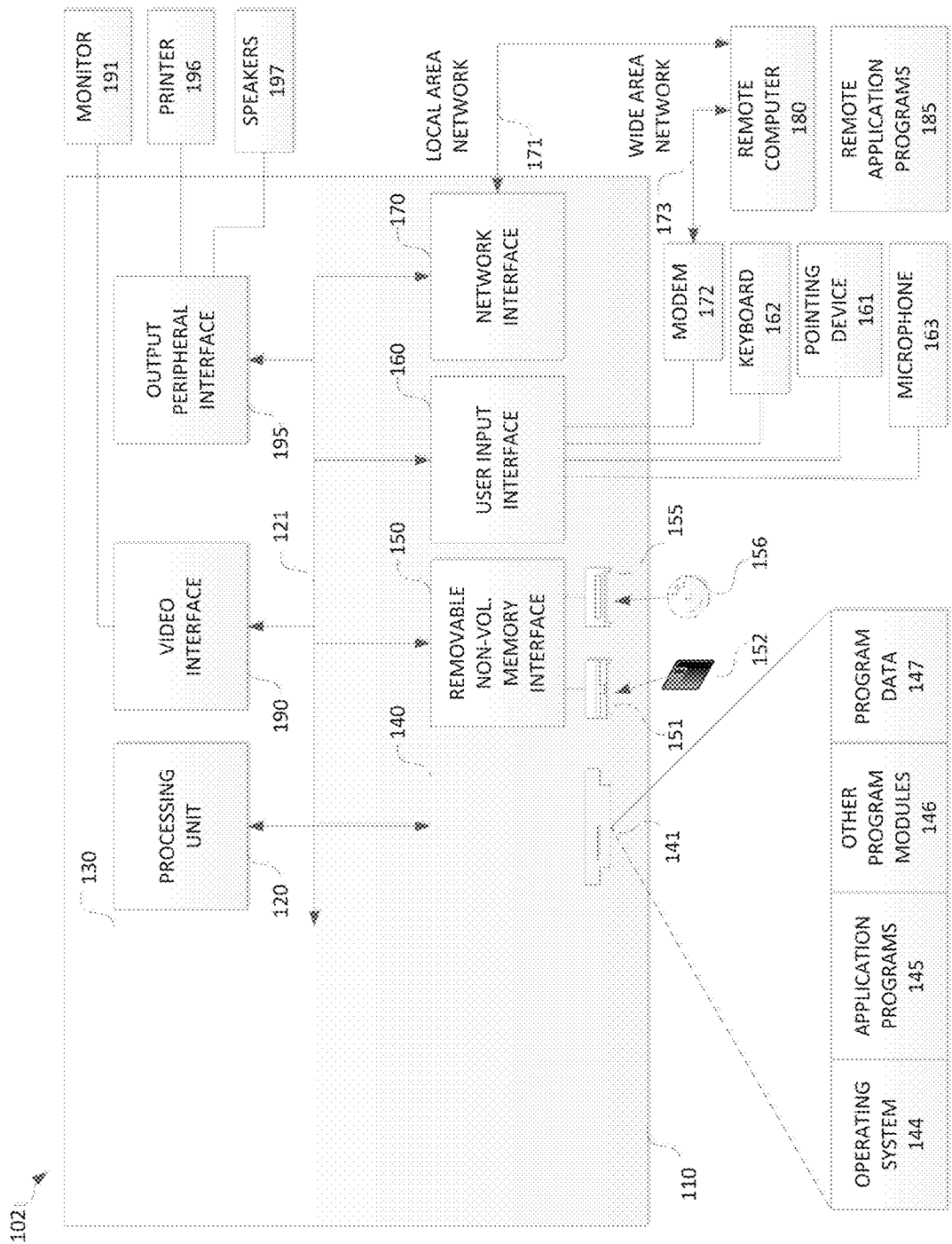
FIG. 1 shows a diagram of an example computing system, in accordance with some embodiments.

Systems and methods for enhanced web browsing are disclosed. A user is provided additional on-demand information associated with potential business leads that are referenced within content of a web page that is being displayed by a web browser. An executable application associated with the web browser on a computer system receives the content of a web page to displayed by the web browser, wherein the user has requested the web page. The executable application parses the content of the web page to identify a reference to at least one potential lead and determines whether the at least one potential lead is associated with at least one record in a database. The executable application causes the contents of the web page to be displayed by the browser with the one or more references highlighted and linked to the at least one record in the database. Thereafter, a user may select one of the highlighted references of the potential lead if the user wants more information on the potential lead. In response to the selection of one of the highlighted references, the executable application causes an object to be displayed by the web browser, wherein the information on the potential lead is displayed by the web browser.

While one or more implementations and techniques are described with reference to an embodiment in which an executable application is associated with a web browser executing on a client device and having a communication connection to an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

The systems and methods will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to log into a server computing system using authentication. For some embodiments, the server computing system may be associated with a multi-tenant database environment. For example, the multi-tenant database environment may be associated with the services provided by Salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS)

133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
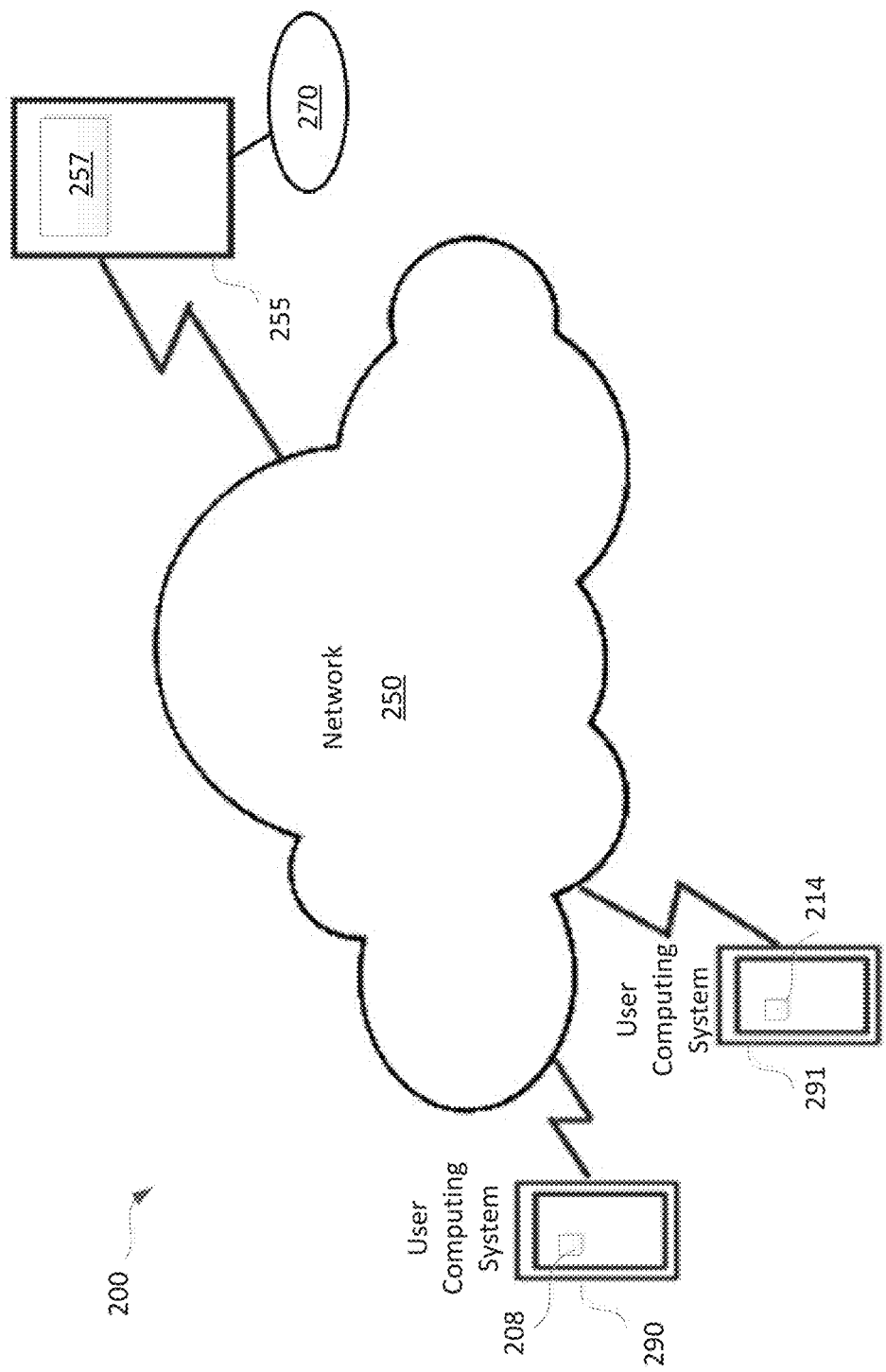
FIG. 2 shows a diagram of a high level example of a network environment, in accordance with some embodiments.

FIG. 2 shows a diagram of a high level example of a network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing system 255 via the network 250.

Each of the computing systems 290 and 291 may include a respective application module 208 and 214. A user may use the computing system 290 and the application module 208 to connect to and communicate with the server computing system 255 and log into application 257 (e.g., a Salesforce- .com® application). For some embodiments, encrypted data may be transmitted between the server computing system 255 and the computing system 290 or 291. For some other embodiments, encrypted data may be transmitted between the computing systems 290 and 291.

Figure 3:
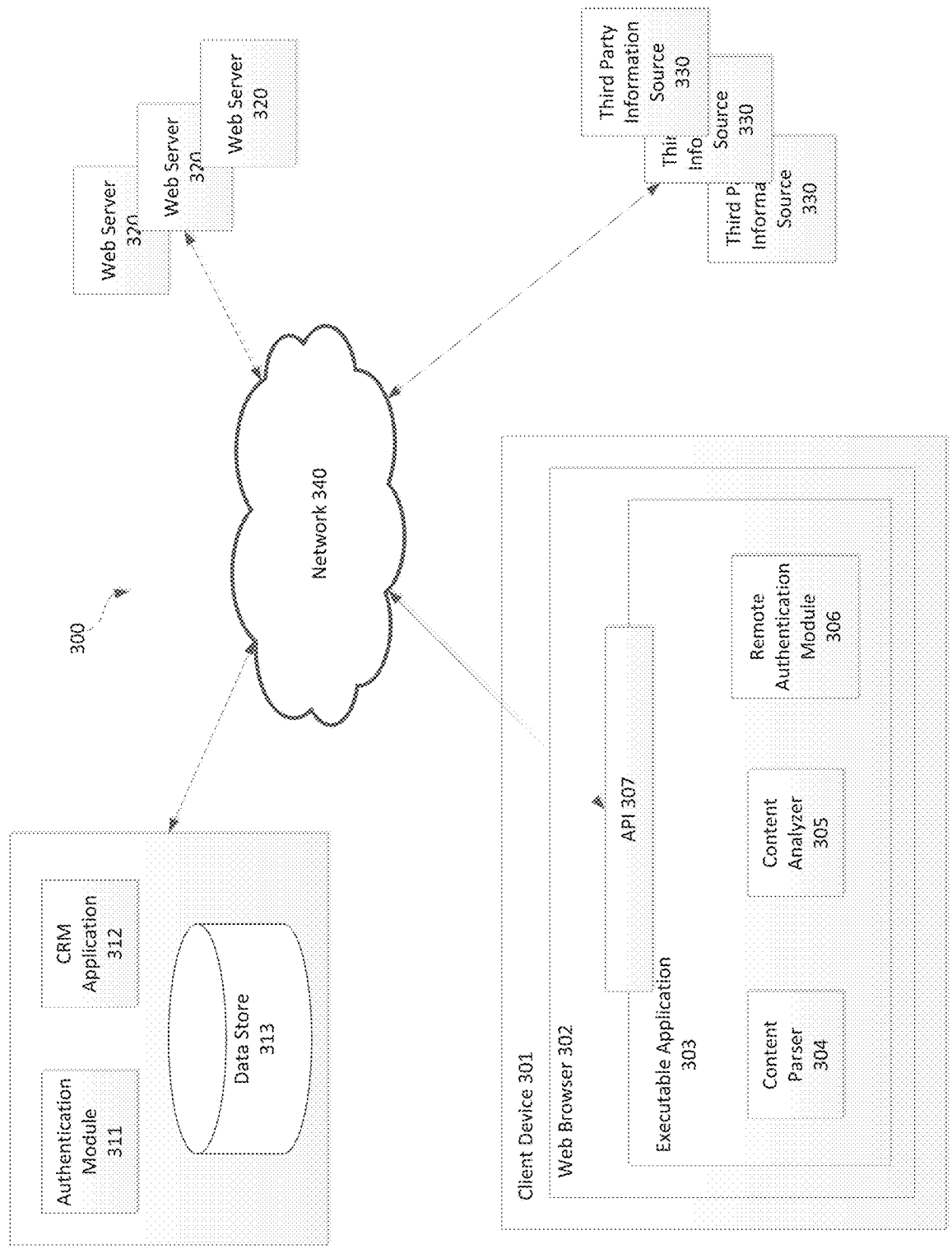
FIG. 3 shows a diagram of a lower level example of a network environment, in accordance with some embodiments

FIG. 3A shows a low level example diagram of a network environment, in accordance with some embodiments. Diagram 300 includes client device 301 that includes a web browser 302. The client device 301 can communicatively connect to various web servers 320 over network 340 to access web-based content, such as web pages hosted on the web servers 320. The web servers 320 provide content, such as text, documents, images video, and the like, to the web browser 302.

The web browser 302 includes an executable application 303. The executable application 303 may be a plug-in or a separate software module that modifies the interface and the behavior of the web browser 302. A conventional browser is configured to provide a plugin interface for runtime support of its hosted plugins. A typical plugin is developed with the expectation that it will be able to use browser capabilities at runtime, since plugins are not implemented to execute independently from a browser. A browser can expose a subset of its capabilities to its supported plugins through its plugin interface, such as API 307. For example, a plugin may be programmed to invoke one or more browser functions that are exposed in a browser plugin interface. Other separate software modules that modify the interface and the behavior of the web browser 302 can include, but are not limited to, an add-on or extension associated with the web browser.

In a first embodiment, the executable application 303 includes a content parser 304 and a content analyzer 305. When the web server 320 provides content of a web page to the web browser 302, the executable application 303 intercepts the content of the web page. The content parser 304 included in the executable application 303 parses the content of the web page. The web parser 304 may use any technique to parse the content to identify potential leads referenced within the web content. A potential lead may include, but is not limited to, a business entity, such as a company, business, or the like. A reference to the business entity within a web page can include a company/business name, a logo, a contact of an individual associated with a company/business, a stock symbol, or any other reference to a company/business.

The web parser 304 may use any method for parsing the web page. One particular method to parse the web content to identify potential leads referenced within the web content is natural language processing (NLP). For example, using NLP algorithms, the content parser can identify names of companies, businesses, and contacts of individuals associated with a company or business. NLP algorithms are typically based on machine learning algorithms Instead of hand-coding large sets of rules, NLP can rely on machine learning to automatically learn these rules by analyzing a set of examples (i.e. a large corpus, like a book, down to a collection of sentences), and making a statistical inference. In general, the more data analyzed, the more accurate the model will be.

NLP is a way for computers to analyze, understand, and derive meaning from human language in a smart and useful way. By utilizing NLP, the web content can be organized and structured knowledge, and can perform tasks such as automatic summarization, translation, named entity recognition, relationship extraction, sentiment analysis, speech recognition, and topic segmentation. Apart from common word processor operations that treat text like a mere sequence of symbols, NLP considers the hierarchical structure of language: several words make a phrase, several phrases make a sentence and, ultimately, sentences convey ideas. NLP is used to analyze text, allowing machines to understand how humans speak and write. This human-computer interaction enables real-world applications like automatic text summarization, sentiment analysis, topic extraction, named entity recognition, parts-of-speech tagging, relationship extraction, stemming, and more. NLP is commonly used for text mining, machine translation, and the like.

Once the web parser 304 has parsed the web content and identified potential leads referenced within the web content, a content analyzer 305 determines whether the identified potential leads are associated with at least one record stored in a database 310.

The database 310 may be a customer relationship management (CRM) database and/or an on-demand database and/or a multi-tenant database. The database 310 includes a data store 313 that stores at least one record for each lead and/or potential lead for a user. Each record includes data about each lead and/or potential lead. The data can be structured into a variety of fields, such as business name, contact name, telephone number, fax number, notes and the like.

In order for the content analyzer 305 to determine whether the identified potential lead is associated with at least one record stored in the database 310, the executable application 303 must first authenticate the user with the database 310 so that the executable application 303 can communicatively connect with and access the database 310.

Authentication of the user via the executable application is done for each user browsing session, so that the user's credentials are associated with the browsing session. The executable application 303 may request the user's credentials at the beginning of each browsing session, when the executable application 303 is activated or triggered in the web browser 302, or at any time before the executable application attempts to accesses the database 310. For example, a user may manually activate the executable application 303 by selecting a button or element within the web browser 302 and based on the selection of the button or element, the executable application may request the user to enter in their user credentials. In another example, the executable application 303 may be automatically activated each time the user opens a new user browser session, wherein the executable application, would request the user to enter their user credentials when the new browser session is initiated.

The executable application 303 will present the user with an authentication request via a remote authentication module 306. For example, the executable application 303 may cause a display object, such as a pop-up window, to be displayed. The display object include a request for authentication information, such as a username and password, for the user's account associated with the database 310.

The authentication of the user is only valid for a single browsing session and the user will be required to provide authentication information, such as a log-in username or password, each time a new browsing session is initiated by the user. The API 307 will serve as an interface between the executable application 303 and the database 310. The executable application 303 will provide an API call via the API 307 to an authentication module 311 of the database 310. The executable application 303 via the API 307 will transmit the authentication information to the authentication module 311 of the database 310. The authentication module 311 will then provide confirmation of authorization to the remote authentication module 306 of the executable application 303. It may be appreciated that in another embodiment, any process of authentication may be used to authenticate the user on the database 310 such that the executable application 303 may communicatively connect with and access the database 310. Authentication may be required only at the beginning of each browsing session. Once a user has completed a browsing session, the user may have to re-authenticate at the beginning of the next browsing session.

In order for the content analyzer 305 to determine whether the identified potential leads are associated with at least one record stored in an database 310, in some instances, the API 307 provides a translation layer which allows the content analyzer 305 to send requests for queries or searches for the identified potential leads to a database application 312, which may be a CRM application 312. The database application 312 performs the query or search of the records stored in the data store 313 and returns the potential leads that are stored as records in the database to the executable application 303 via the API 307.

Based on a determination that the at least one business entity is associated with at least one record stored in the database 310, the executable application 303 causes the contents of the web page to be displayed by the browser with the references to the identified one or more potential leads highlighted and linked to the at least one record in the database. For example, a web page may include a reference to Salesforce™ and Salesforce™ is associated with a record stored in the database 310. The executable application 303 may provide instructions to the web browser 302 to display an enhanced web page, wherein the presentation of the web page would be changed to highlight all the references to Salesforce™ within the content of the web page. Highlighting the references includes bolding of the text, highlighting the text in a difference color, changing the font of the text, underlining the text, italicizing the text, and the like, so that the references are distinct from the rest of the content of the web page. Additionally, the references to Salesforce™ would also be linked to the at least one record in the database 310. One means for linking the at least one record in the database to the web page would be by mapping the database record to the web page that employ link paths which contain anchor texts from multiple paths through the web ending at the web page. In some cases, other means for linking the at least one record in the database to the web page can be employed.

In some instances, references to identified potential leads that have been determined to not have an association with at least one record stored in the database may also be highlighted within the content web page displayed to the user. Additionally, in some instances, these references may also be linked to at least one third party information source. The highlighting of the references to identified potential leads that have been determined to not have an association with at least one record stored in the database is different than the highlighting of the references to identified potential leads that have been determined to have an association with at least one record stored in the database. For example, potential leads that are linked to database records may be highlighted in blue, while potential leads that are not linked to any database records may not be highlighted. In another example, potential leads that are linked to database records may be highlighted in green, while potential leads that are not linked to any database records may be highlighted in yellow.

A user viewing the content on the web page on the web browser 302 may select a highlighted reference to the potential lead that is linked to a database record within the content of the web page by clicking on a highlighted reference, hovering over the highlighted reference with a cursor, or the like. When the user selects the reference, the executable application 303 causes an object to be displayed by the web browser 302. The object to be displayed may include at least some of the information from the associated record stored in the database 310. The object may be a pop-up window displayed by the web browser 302 or any other type of display element displayed by the web browser 302, such as a separate browser tab, a table on the side of a browser window, or the like.

The information to be displayed in the display object may be predefined by an administrator or the user. For example, an administrator may require only certain fields of a record containing basic information to be displayed in the display object, such as business entity name, the number of employees, gross revenue, and business entity website. A user may click on the information displayed in the display object to display additional information stored in the database record. For example, a user may select a reference to Salesforce™ that is highlighted and linked to a record stored on the database within an enhanced web page. Once the user selects the reference, a pop-up display element is displayed to the user, wherein the pop-up display element includes information associated with 4 different records related Salesforce™. The data, for each of the 4 records, that is displayed includes the name, revenue and website of a potential lead (i.e. Salesforce™) associated with each record. A user may select one of the names of the potential leads that are displayed in the pop-up display element. When the user selects one of the names of the potential leads, another pop-up display object is displayed with additional information that is stored in the corresponding record in the database 310.

Additionally, the user may select a reference to a potential lead displayed in the content of the web page that has not been highlighted and linked to any records stored on the database 310, or a potential lead that has not been linked to any records stored in the database 310 but has been highlighted differently from the highlighting of potential leads that have been linked to any records stored in the database 310. The user may select the reference to the potential lead by using a cursor to manually highlight the reference to the potential lead and/or by right clicking on reference of the potential lead. The executable application 303 may then communicatively connect with a third-party information source 330 and retrieve/receive data from the third-party information source 330. For example, the executable application 302 may generate a search on the third-party information source 330 or provide the third-party information source 330 instructions to search for the potential lead.

The third-party information source 330 may be an external independent data source, such as Data.com®. The third-party information source 330 may then provide the executable application 303 information associated with the potential lead. The executable application 303 may then generate an object to be displayed by the web browser 302 that includes the information from the third-party information source 330. In some instances, the executable application 303 may structure the information received by the third-party information source 330 to display only specific information associated with the potential lead, such as contact information.

Once the retrieved information associated with the potential lead from the third party information source is displayed in the display window by the web browser 302, the user may select a button to import the data and store the data in the database system 310 in a newly created record in the database. In one instance, the executable application 303 may transmit instructions to the database 310 to create a new record and store the data for the potential lead in the newly created record.

The information displayed in the display object for the selected potential lead may also include a link to the third party information source, wherein the user can select the information so that additional information can be displayed that was retrieved from the third party information source.

In a second embodiment, upon receiving contents of a web page to be displayed on the web browser 302, the content parser 304 associated with the executable application 303 parses the content of the web page to identify potential leads, such as business entities, referenced within the content of the web page. As discussed previously, the content may be parsed using any known parsing technique, such as natural language processing.

Once the reference to potential leads or business entities are identified in the web content, the content analyzer 305 communicatively connects to the database 310 via the API 307. It is assumed that the user has already authenticated the browsing session, via the executable application 303, with the database 310 so that the executable application 303 may communicatively connect with the database 310 during the browsing session. The content analyzer 305 may issue an API call via the API 307 to the database application 312 associated with the database 310 and provide instructions to perform a query of the data store 313 associated with the database 310 to determine if at least one of the potential leads is associated with at least one record stored in the data store 313 of the database 310. The database application 312 may transmit the results of the query to the executable application 303.

Upon receiving the search query results, the executable application 303 may retrieve at least some information from the data record stored in the database 310 for the leads or business entities that have data records stored in the database 310. In another instance, the search results would include the name of the potential leads that have associated data records and some information from those data records. The information that is taken from the data records and provided in the search result or to the executable application 303 can be data from fields of the data record that are predefined by an administrator or can be the all the data stored in the data record.

The executable application 303 may then generate a display object that includes the potential leads and the associated information and cause the display object to be displayed the web browser 302 that renders the web page for the user to view. The display object may be a pop-up window or any other type of display window, such as a separate display element placed on the side of the web page by the web browser 302. The display object may also include potential leads referenced in the web content that do not have at least one record stored on the database 310. In some instances, the potential leads that do not have at least one record stored on the database 310 may be highlighted in the display object to indicate they are new potential leads not stored in the database 310.

The user may select on any of the potential leads within the display object to obtain more information. If the user selects a potential lead within the display object that has a record stored in the database 310, the executable application 303 may retrieve and cause to display additional information from the record stored on the database 310 for the selected potential lead. If the user selects a potential leads within the display object that does not have a record stored in the database 310, the executable application 303 may retrieve and cause to display additional information from a third-party information source 330. The user may also import the retrieved information for the potential leads into the database 310 if the potential leads do not have an associated record that is stored on the database 310 and store the potential leads and the retrieved information in the data store 313 associated with the database 310.

In a third embodiment, once the web browser 302 receives a request for a web page, the web browser 302 may display the web page. Once the web page is displayed, a user may select a potential lead referenced within the content of the web page. For example, the user may highlight reference to a business entity and/or click on the reference to the business entity. In some instances, once the reference to the potential lead is selected, the executable application 303 may provide a display window having a list of third-party information sources 330. The user may select one of the third-party information sources 330 listed within the display window to search for information associated with the potential lead. Once a user selects one of the third-party information sources 330, the executable application 303 via the API 307 may search the selected third-party information source 330 for the information associated with the selected potential lead or provide instructions for implement a search to the third-party information source 330 for the information associated with the selected potential lead. In another instance, once the reference to the potential lead is selected, the executable application 303 may automatically retrieve from a third party information source or provide instructions for implementing a search on the third party information source, information associated with the selected potential lead. The executable application 303 may then generate an object to be displayed by the web browser 302 that includes the information gathered from the third-party information source 330.

Once the information associated with the potential lead is displayed in the display window by the web browser 302, the user may select a button to import the data and store the data in the database system 310, assuming the user is authenticated with the database 310 via the executable application 303. The executable application 303 may, in some instances, request a user enter authentication information at the beginning of a user browsing session or at the first time, during the browsing session, that the executable application 303 needs to communicate or access the database 310.

In a fourth embodiment, once the web browser 302 receives a request for a web page, the web browser 302 may display the web page. Once the web page is displayed, a user may select a potential lead referenced within the content of the web page. In response to the user selecting the potential lead, the executable application may first search the database 310 for a record associated with the potential lead or transmit instructions to the database 310 to search/query the database store for a record associated with the potential lead. If a record associated with the potential lead is found, the information from the record may be displayed in the display window. In some instances, along with the information from the record, a list of third-party information sources 330 and/or information from the third party information sources 330 is displayed in the display window. The user may request to see additional information by selecting on the data that was displayed in the display window or selecting one of the third party information sources 330.

If there is no record associated with the potential lead within the database, the executable application 303 will retrieve information from a third party information source or transmit instructions to search or query the third party information source associated with selected potential lead. The retrieved or received information from the third party information source will then be displayed in the display window.

Once the information associated with the potential lead is displayed in the display window by the web browser 302, the user may select a button to import the data and store the data in the database system 310, assuming the user is authenticated with the database 310 via the executable application 303. The executable application 303 may, in some instances, request a user enter authentication information at the beginning of a user browsing session or at the first time, during the browsing session, when the executable application 310 needs to communicate or access the database 310.

Although four different embodiments are disclosed, a combination of the functionality within the any one of the embodiments may be used within any of the other embodiments.

Figure 4:
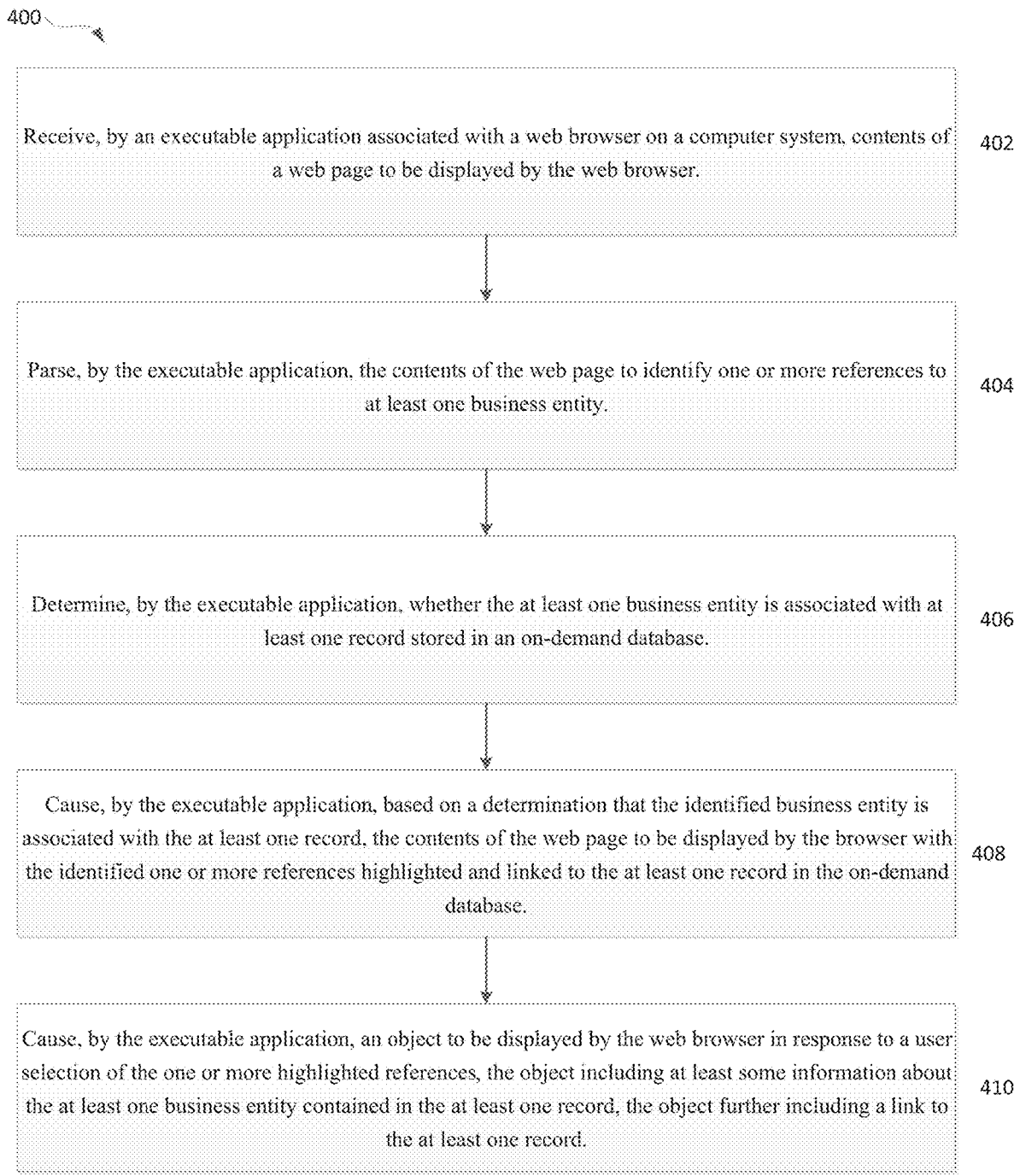
FIG. 4 shows a flow chart diagram illustrating a method of providing additional on-demand information associated with content displayed on a web page, in accordance with some embodiments.

FIG. 4 shows a flow chart diagram illustrating a method of providing additional on-demand information associated with content displayed on a web page, in accordance with some embodiments.

While browsing different web pages, a user may come across references to potential leads, such as business entities, referenced within the contents of the web page. An executable application associated with a web browser displaying the web page will provide a user the opportunity to view additional on-demand information associated with the business entity referenced in the content of the web page. The additional information may be retrieved from a database.

For each user browsing session, the executable application may request a user to enter authentication information associated with the database. Once the executable application receives the user's authentication information, the executable application transmits the authentication information to the database. Once the authentication information is confirmed by the database, a confirmation is sent to the executable application. The executable application, once the confirmation is received, is able to communicatively connect with and access the database to search for and retrieve data from data records associated with business entities found within the content of the web pages displayed by a web browser.

In step 402, the executable application associated with a web browser on a computer system, receives contents of a web page to be displayed by the web browser. For example, when a user requests a web page, the executable application retrieves or receives contents of the web page so that the executable application may analyze the content.

In some embodiments, a user may select a button that activates the executable application in order to analyze the web pages. For example, the user may want to activate the executable application when the user is browsing news articles that are of interest to their employment. Similarly, the user may de-activate the executable application when the user does not want the web pages they are viewing to be analyzed and additional information supplied. For example, a user may be browsing shopping websites. The shopping websites are unrelated to their employment; and therefore, the user may deactivate the executable application so that the web pages being displayed by the web browser will not be analyzed by the executable application.

In step 404, the executable application parses the contents of the web page to identify one or more references to at least one business entity. For example, the executable application may use natural language processing to parse the content and identify business entities. Business entities may include company or business names and/or names of contacts.

In step 406, the executable application determines whether the at least one business entity is associated with at least one record stored in a database. In one embodiment, the business entity may be associated with more than one record in the database. For example, a company, such as Acme, may have many subsidiaries, such as Acme Ltd, Acme Technologies, and Acme Worldwide Inc that are stored as separate records in the on-demand database system. When the executable application queries or transmits instructions to query the on-demand database system for a business entity named Acme, the query may return records of Acme Ltd, Acme Technologies, and Acme Worldwide Inc. as records associated with the business entity Acme.

In step 408, based on a determination that the at least one business entity is associated with the at least one record as described in step 406, the executable application will cause the contents of the web page to be displayed by the browser with the one or more references highlighted and linked to the at least one record in the database. For example, the executable application may transmit instructions to the web browser to display the contents of the web page. The executable application may also alter the presentation of the web page by highlighting the references within the content of the web page. The executable application may also alter the reference within the content of the web page so that the reference is linked to the record in the database. For example, each reference may have a hyperlink to the record in the on-demand database.

In step 410, once a user selects one or more of the highlighted references, the executable application causes an object to be displayed by the web browser. In one embodiment, the object displays at least some of data in the corresponding data record. The data to be displayed in the object is predefined by an administrator. For example, an administrator may define which fields of the data record are to be displayed within the display object. If a user wants more information from the data record, the user may be able to select the business entity listed in the displayed object. In one embodiment, a new web page associated with database is displayed for the user when the user wants more information. In another embodiment, additional information may be retrieved by the executable application from the database and displayed in a second display object.

Additionally, the user may be provided the option to edit the record displayed in display object. For example, a display object may list basic data about Acme Ltd, Acme Technologies, and Acme Worldwide. If the user selects Acme, Ltd., additional information from the associated record in the database would be provided to the user. The user may select a button that allows the user to edit the information or add notes. The user may be able to change the information or add additional information or notes within the display window for a business entity. Once the information is changed or added, the changed or new information can be imported to the database and stored in the data store.

FIG. 5 shows a screenshot of an example web page after having the executable application applied to the example web page, in accordance with some embodiments such as the method disclosed in FIG. 4. For this example, it may be assumed that the user has authenticated the web browsing session with a database via the executable application. As a result, after the user requests the web page, the executable application may receive the contents of the web page, parse the contents of the web page to identify business entities referenced within the contents of the web page, determine whether at least one of business entities is associated with at least one record stored in the on demand database, and cause the contents of the web page to be displayed by the web browser with the references highlighted and linked to at least one record in the database.

For example, in FIG. 5, a user may have been browsing the internet and came across an article posted on a web page that announced a strategic agreement between two companies, Salesforce® and Dell®. The user may be interested in determining whether information associated Salesforce® or Dell® is stored on the on-demand database system as a lead or potential lead. The user no longer has to separately sign into their account on the database system website and search for the companies. The executable application has already determined that a record associated with Salesforce® is stored in the database and highlighted and linked the reference to Salesforce® in the content of the webpage to the record, as shown in FIG. 5. Dell® has not been highlighted because the executable application determined that a record associated with Dell® is not located in the database. In other embodiments, the executable application highlights the reference to Salesforce® in green because a record associated with Salesforce® is stored in the database, and highlights the reference to Dell® in yellow because no record associated with Dell® is located in the database.

A user may click on any of the highlighted references to Salesforce® to retrieve information stored in the record by the database. For example, as illustrated in FIG. 5, a pop-up display window is displayed in response to the user selecting a highlighted reference to Salesforce® within the web page. Salesforce® may have multiple records associated with it within the database. All the records associated with the Salesforce® are listed in the display window along with basic information from the record. In this example, information associated with the following fields were retrieved from the record and displayed to the user: country, industry, name, number of employees, revenue and website. If the user wants to retrieve additional information that is stored in the record and/or wants to edit (such as adding notes) the record, the user merely has to select one of the business entities listed in the display window.

If the user wants more information on Dell®, the user merely has to select the reference to Dell® that is within the content of the web page. The user may highlight the reference to Dell® or right click on the reference to Dell®. Once the user selects the reference to Dell®, a display window is displayed by the web browser displaying the web page. The display window may include a list of third-party information sources that the user can choose from to provide additional information for Dell®. Once the executable application retrieves/receives the additional on-demand information from the third-party information source and the additional on-demand information is displayed for the user, the user may select to import and store the additional on-demand information and/or business entity, Dell®, within the database. Thereby, the user does not have to veer from their web page articles to obtain more information associated with business entities referenced within the article on the web page.

Figure 6:
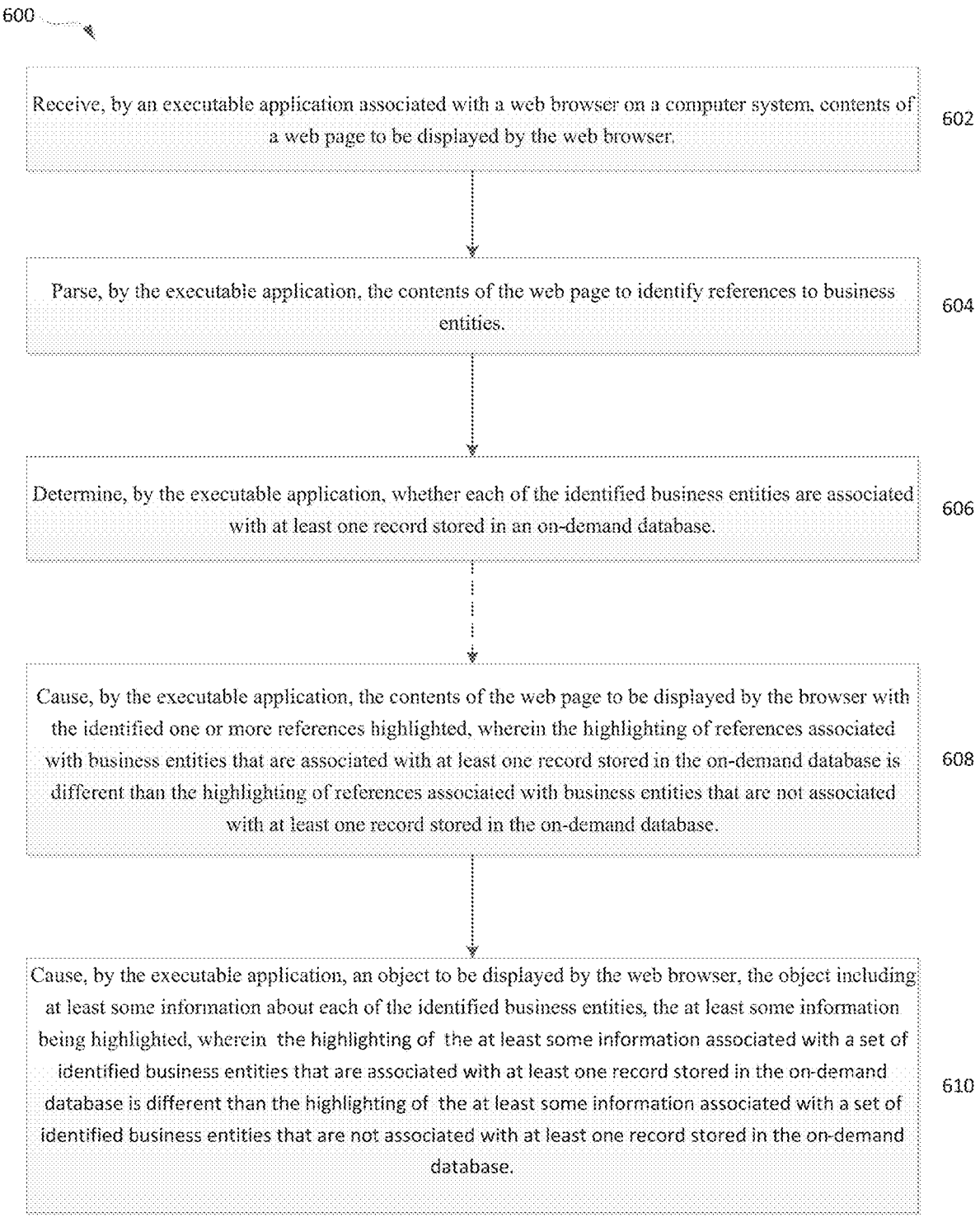
FIG. 6 shows a flow chart diagram illustrating a method of providing additional on-demand information associated with content displayed on a web page, in accordance with some embodiments.

FIG. 6 shows a flow chart diagram illustrating a method of providing additional on-demand information associated with content displayed on a web page, in accordance with some embodiments.

In step 602, an executable application associated with a web browser on a computer system receives contents of a web page to be displayed by the web browser.

In step 604, the executable application parses the contents of the web page to identify references to business entities within the contents of the web page.

In step 606, the executable application determines whether each of the business entities are associated with at least one record stored in an on-demand database. For example, the executable application may transmit instructions to the on-demand database to query or search the records stored in the on-demand database to identify the records that are associated with the identified business entities.

Optionally, in step 608, the executable application may cause the contents of the web page to be displayed by the browser with the identified one or more references highlighted. In some instances, the highlighting of references associated with business entities that are associated with at least one record stored in the on-demand database may be different than the highlighting of references associated with business entities that are not associated with at least one record stored in the on-demand database.

In step 610, the executable application causes an object to be displayed by the web browser. In some instances, the object includes a list of the business entities that were identified in the content of the web page. In other instances, the object includes at least some information about the identified business entities. The information about identified business entities that are associated with at least one record in the on-demand database is retrieved from the on-demand database. The information about identified business entities that are not associated with at least one record in the on-demand database is retrieved from a third party information source.

The business entities listed in the object or the information about the business entities listed in the object may be highlighted based on whether the business entities are associated with the record in the database or are not associated with the record in the database. Information about the business entities that are associated with at least one record stored in the on-demand database is different than the highlighting of the at least some information about the business entities that are not associated with at least one record stored in the on-demand database within the display object.

Figure 7:
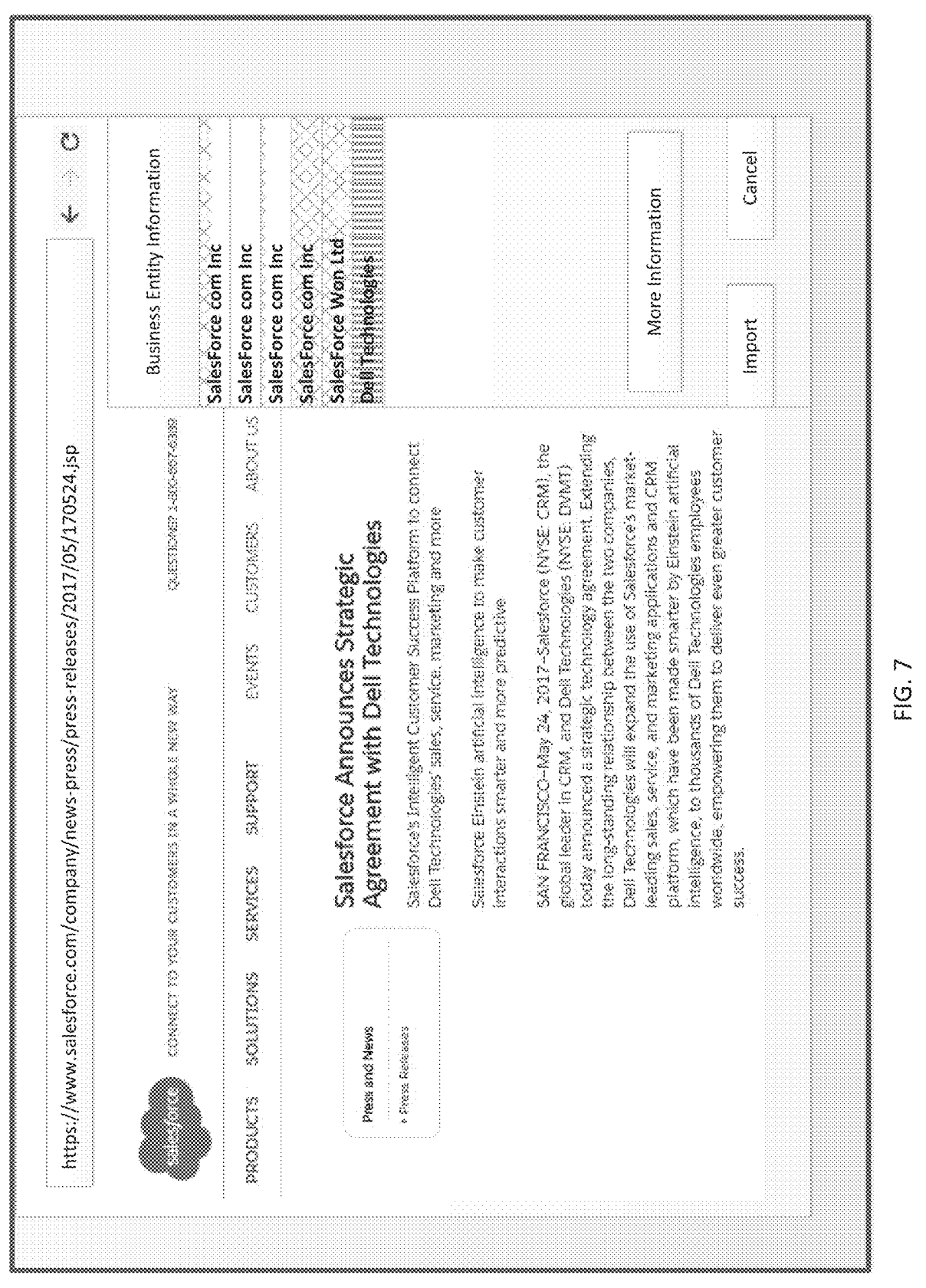

FIG. 7 shows a screenshot of an example web page after having the executable application applied to the example web page, in accordance with some embodiments such as the method disclosed in FIG. 6. For this example, it may be assumed that the user has authenticated the web browsing session with a database via the executable application. As a result, after the user requests the web page, the executable application receives the contents of the web page, parses the contents of the web page to identify business entities referenced within the contents of the web page, and determines which identified business entities are associated with at least one record stored in the on demand database.

Once the executable application determines which identified business entities are associated with at least one record stored in the on demand database, the executable application causes a display object to be displayed by the web browser. The display object lists of the identified business entities, as shown in FIG. 7. Furthermore, business entities that are associated with at least one record within the on demand database may be highlighted in a first manner, and business entities that are not associated with at least one business record within the on demand database may be highlighted in a second manner. For example, in FIG. 7, Salesforce™ and Dell Technologies™ were identified as business entities within the contents of the web page. The executable application determined Salesforce™ had 5 associated records within the on-demand database and Dell Technologies™ did not have any associated records within the on-demand database. Based on this determination, the display object lists at least some information from the records in the on-demand database related to Salesforce™ and highlights this information in a first manner. In this example, the display object only lists the names of the business entities related to the record in the on-demand database. Furthermore, the identified business entity that did not have an associated record in the on-demand database is also listed, Dell Technologies™. In one embodiment, the executable application may obtain at least some information related to Dell Technologies from a third party information source and display the at least some information in the display object. Dell Technologies™ and or the at least some information is highlighted in another manner in the display object.

The user may select any of the business entities or information listed in the display object to obtain additional information. For example, a user may select SalesForce Won Ltd™ listed in the display object in FIG. 7. The executable application may automatically retrieve additional information from record stored in the on-demand database associated with SalesForce Won Ltd™ or the user may have to select a "more information" button. The additional information may be displayed in another display object within the web browser. The user may also select Dell Technologies™ from the display object to obtain additional information. The executable application can retrieve additional information for Dell Technologies™ from a third party information source, such as Data.com™ and display the additional information in a new display object.

Additionally, if at least some information from a third part source is displayed in a display object, the user may select an "import" button and transmit instructions to the on-demand database to store the at least some information. In some instances, the executable application may transmit instructions to the on-demand database to create a new record associated with Dell Technologies™ and store the information in the new record associated with Dell Technologies™.

FIG. 8 shows a flow chart diagram illustrating a method of providing additional on-demand information associated with content displayed on a web page, in accordance with some embodiments. In reference to FIG. 8, a web page may be displayed for a user, wherein the web page is not parsed by the executable application to identify business entities.

In step 802, an executable application receives a user a user selection of a reference to a business entity included within contents of a web page being displayed by the web browser during a user browsing session. For example, a user may highlight a business entity within the contents of the web page being displayed to a user using the cursor.

In step 804, in response to the user selection of the reference to the business entity, the executable application causes a first object to be displayed by the web browser. The first object includes at least some information associated with the business entity retrieved from a third party information source. For example, in response to a user selection of a business entity, the executable application may retrieve at least some information from a third party information source associated with the business entity. This information is then displayed for a user in a display object.

In step 806, a user may provide user input indicating the user's desire to store the information in the on-demand database. For example, a user may select or click on an "import" button. Based on this user input, the executable application may transmit instructions to the on-demand database to store the information.

In one embodiment, the on-demand database may search for a record associated with the business entity selected by the user. If a record associated with the business entity is found in the on-demand database, the on-demand database may update the record with the information. The on-demand database may update the record by overwriting the information within the existing record. The on-demand database may also update the record by adding the new information to the existing record and providing indication that the new information was recently added, instead of overwriting information within the record. For example, the new information may be stored in a "notes" field within the record, or the new information may be added with a version number or time stamp indicating that the new information was just added. The on-demand database may also update the record by creating a new version of the record. For example, all records in the database contain two timestamps—begin and end. The begin timestamp denotes the commit time of the transaction that created the version and the end timestamp denotes the commit timestamp of the transaction that when a new version of the record is created. The valid time for a version of a record denotes the timestamp range where the version is visible to other transactions. It may be appreciated by one skilled in the art, that any method of updating a record may be used.

Furthermore, if a record associated with the business entity is found within the on demand database, the on demand database may send a notification to the user via the executable application. Based on the notification, the user may be able to select, within a display object, to view information associated with the record, overwrite the information in the record with the new information, and/or add the information to existing record without overwriting the record. For example, a user may select to view information associated with the record and the executable application may cause another display object to be displayed by the web browser that includes the information from the record.

If the on-demand database does not find a record associated with the selected business entity within the on-demand database, the on-demand database will create a new record and store the information within the newly created record.

Figure 9:
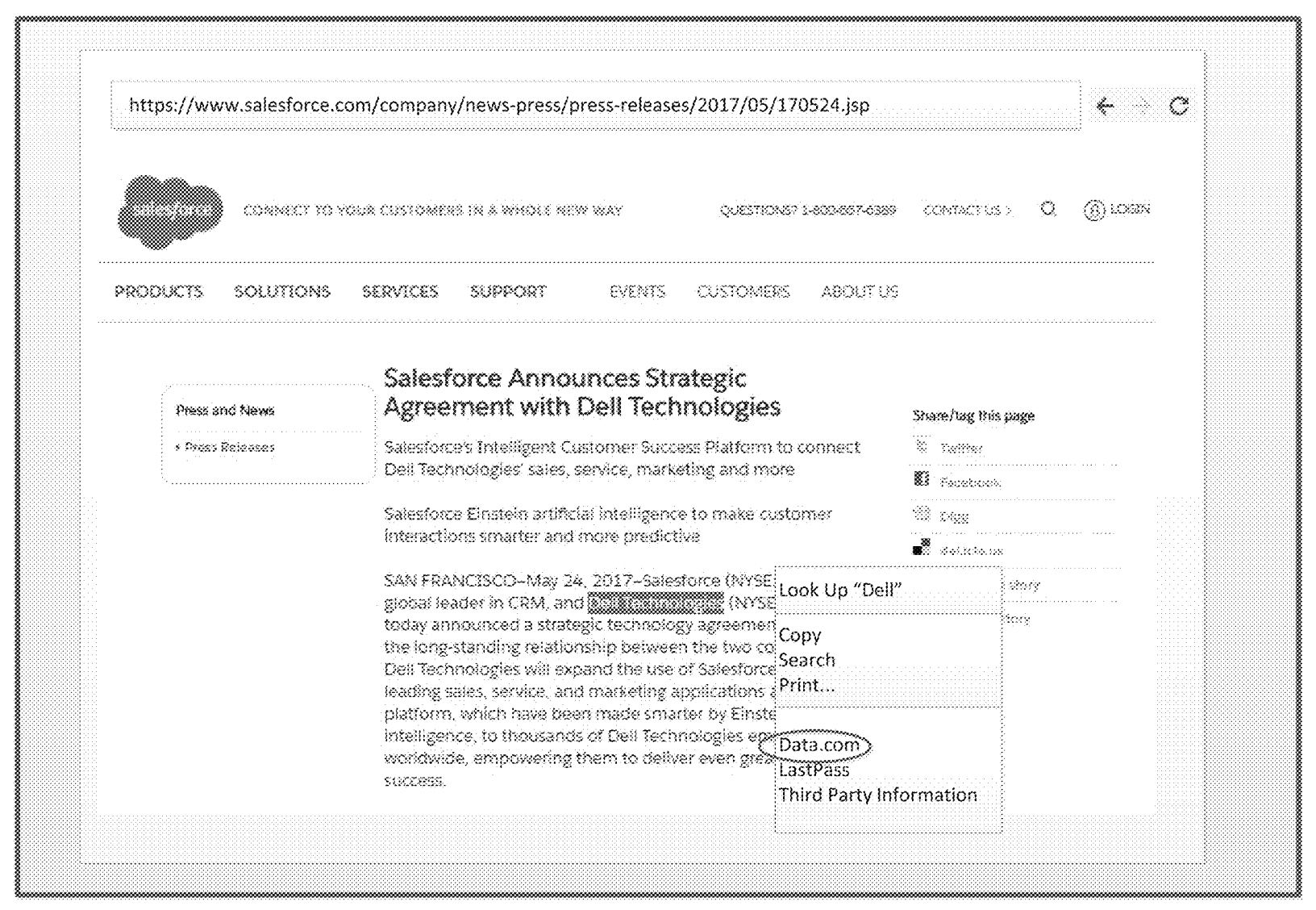
Figure 10:
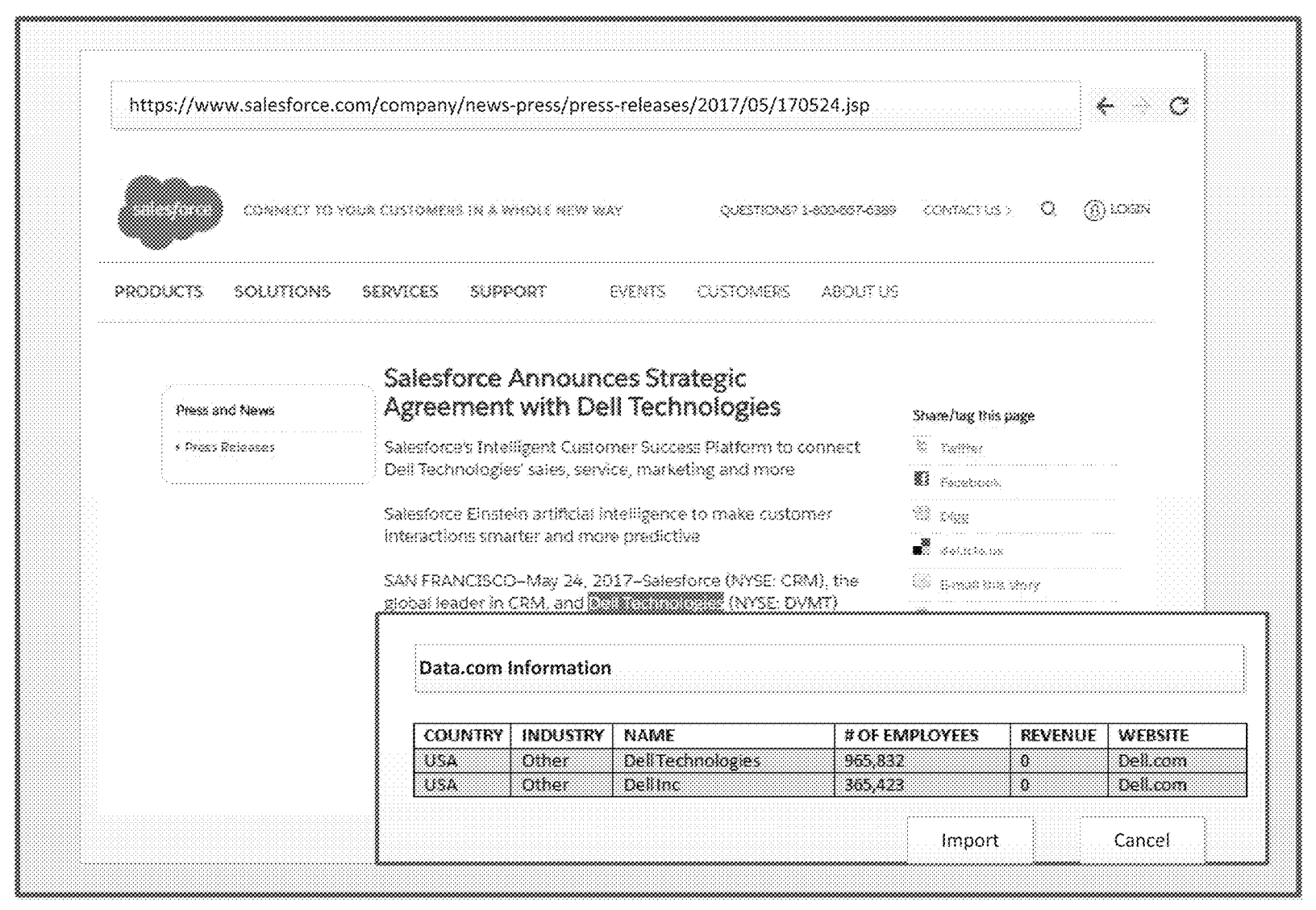

FIGS. 9-10 show screenshots of an example web page after having the executable application applied to the example web page, in accordance with some embodiments such as the method disclosed in FIG. 8.

For this example, it may be assumed that the user has authenticated the web browsing session with a database via the executable application. As a result, after the user requests the web page, the web page is displayed to the user by the web browser.

A user may select a reference to a business entity within the contents of the web page. In FIG. 9, the user selected Dell Technologies™. The user may select the business entity by highlighting the reference to the business entity, right clicking on the reference to the business entity, highlighting and right clicking on the reference to the business entity, and/or the like.

Once the user has selected a business entity, the executable application may provide a display object or a dialog box that lists third party information sources that user may choose from to obtain additional information about the business entity. As illustrated in FIG. 9, the dialog box lists Data.com, LastPass, and Third Party Information as sources for obtaining addition information about the business entity that the user can select from. In another embodiment, the executable application may not provide the display object that lists the third party information sources and instead automatically retrieve additional information from a predefined third party information source.

In some instances, the executable application may analyze the selection of the user to determine if the selection is a business entity. For example, the executable application may use any language processing algorithms to determine if the highlighted reference "Dell Technologies™" is a business entity. If the selection by the user is not a business entity recognized by the executable application, then no action is taken by the executable application.

Once the user selects a third party information source, information associated with the business entity is displayed in a new display object. For example, in FIG. 10, the user selected Data.com™ as a third party information source. The executable application retrieved data from the third party information source that is related to Dell Technologies. Specifically, the executable application retrieved data for Dell Technologies and Dell Inc. The type of information displayed in the display box may be predefined by an administrator or the user. For example, an administrator or user may require that the information to be display relates to the country, industry, name, number of employees, revenue and website associated with the business entity.

If the user would like to store the information within the on-demand database, the user merely has to select Dell Technologies™ or Dell Inc™ and then select the "import" button. The executable application will then transmit instructions to the on-demand database to store the business entity and/or the information associated with the business entity in the on demand database.

FIG. 11 shows a flow chart diagram illustrating a method of providing additional on-demand information associated with content displayed on a web page, in accordance with some embodiments. In reference to FIG. 11, a web page may be displayed for a user, wherein the web page is not parsed by the executable application to identify business entities.

In step 1102, an executable application associated with a web browser on a computer system, receives a user selection of a reference to a business entity included within contents of a web page being displayed by the web browser during a user browsing session.

In step 1104, the executable application determines whether the business entity is associated with at least one record stored in a database in response to the user selection of the reference to the business entity, in response to the user selection. In one embodiment, the executable application may use any technological method to determine if the user selection is of a business entity. For example, the executable application may analyze the user selection using language processing algorithms to determine whether the user selection is a business entity. If the executable application determines that the user selection is not a business entity, then the executable application may take no action or provide a notification that the selection is not a recognized business entity.

In step 1106, the executable application causes a first object to be displayed by the web browser in response to a determination that the at least one business entity is associated with the at least one record, the object including at least some information about the at least one business entity associated with the at least one record, the at least some information about the at least one business entity further including a link to the at least one record.

In step 1108, the executable application causes a second object to be displayed by the web browser in response to a determination that the at least one business entity is not associated with the at least one record, the second object including at least some information associated with the business entity retrieved from a third-party information source.

Figure 12A:
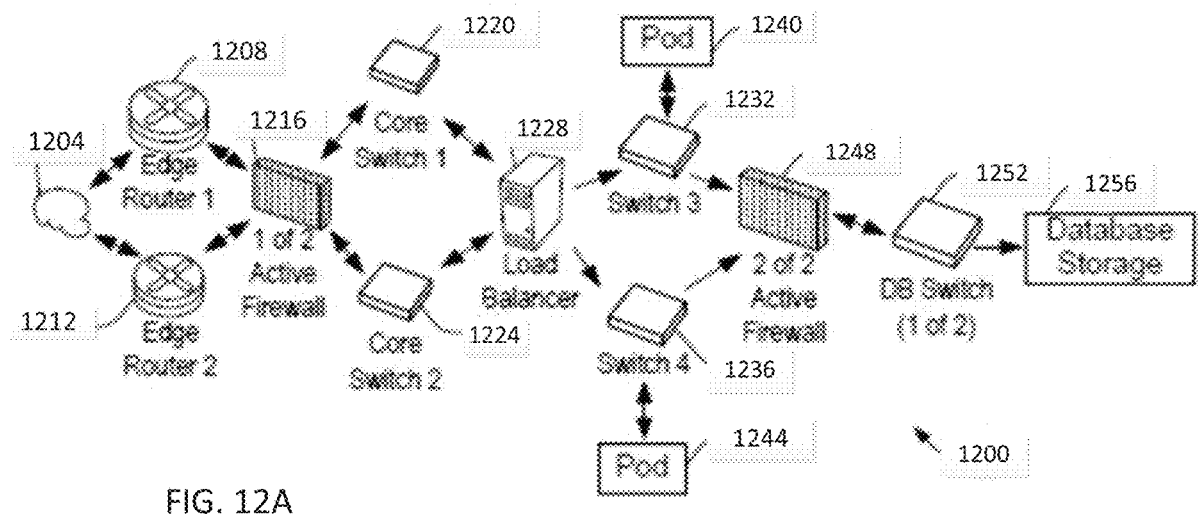
FIG. 12A shows a system diagram illustrating architectural components of an applicable environment, in accordance with some embodiments.
Figure 12:
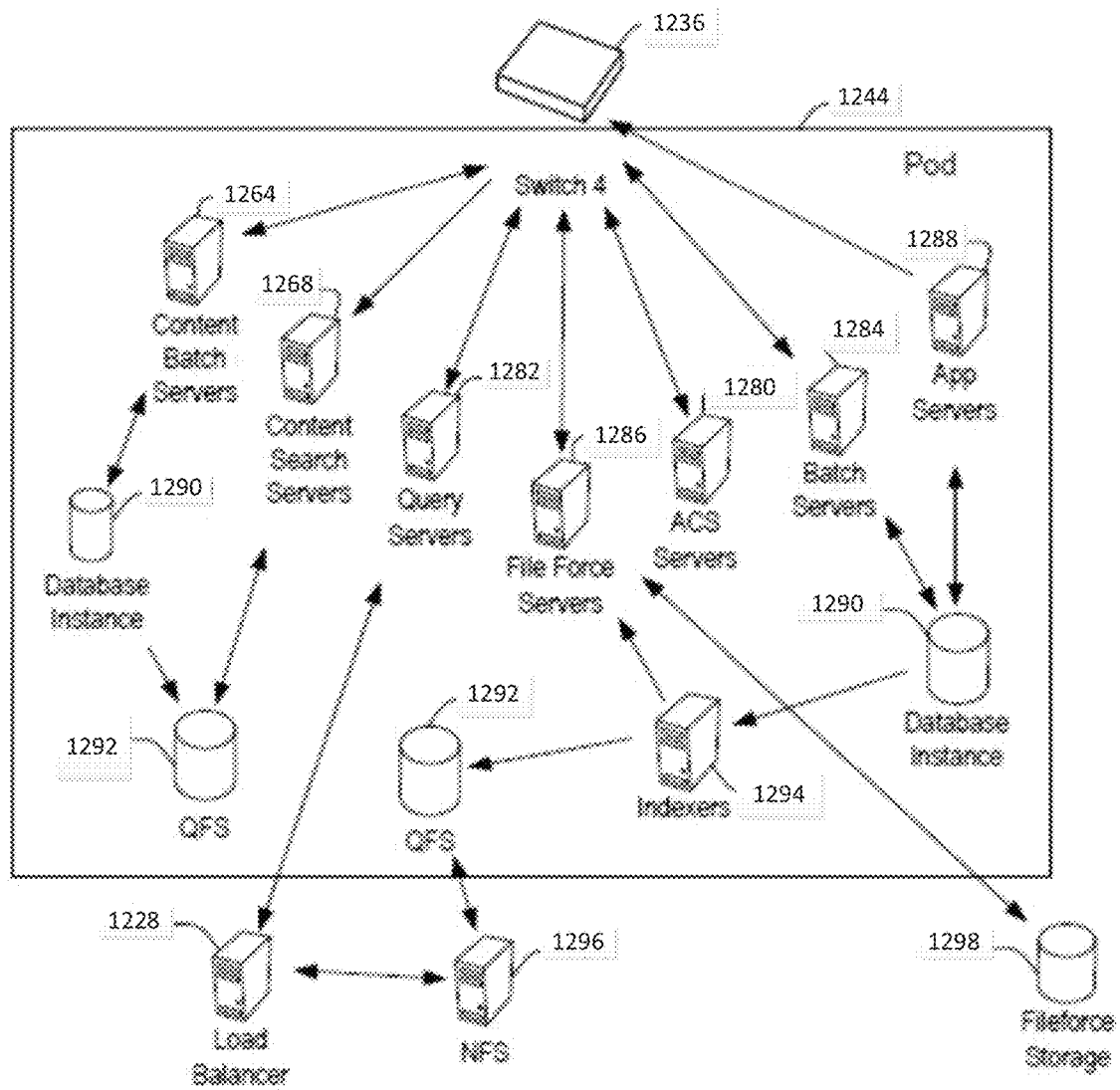
FIG. 12B shows a system diagram further illustrating architectural components of an applicable environment, in accordance with some embodiments.

FIG. 12A shows a system diagram 1200 illustrating architectural components of an on-demand service environment, in accordance with some embodiments. A client machine located in the cloud 1204 (or Internet) may communicate with the on-demand service environment via one or more edge routers 1208 and 1212. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand service environment may communicate with a database storage system 1256 via a database firewall 1248 and a database switch 1252.

As shown in FIGS. 12A and 12B, accessing an on-demand service environment may involve communications transmitted among a variety of different hardware and/or software components. Further, the on-demand service environment 1200 is a simplified representation of an actual on-demand service environment. For example, while only one or two devices of each type are shown in FIGS. 12A and 12B, some embodiments of an on-demand service environment may include anywhere from one to many devices of each type. Also, the on-demand service environment need not include each device shown in FIGS. 12A and 12B, or may include additional devices not shown in FIGS. 12A and 12B.

Moreover, one or more of the devices in the on-demand service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand service environment to access services provided by the on-demand service environment. For example, client machines may access the on-demand service environment to retrieve, store, edit, and/or process information.

In some embodiments, the edge routers 1208 and 1212 route packets between the cloud 1204 and other components of the on-demand service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes' which designate network reachability among autonomous systems on the Internet.

In one or more embodiments, the firewall 1216 may protect the inner components of the on-demand service environment 1200 from Internet traffic. The firewall 1216 may block, permit, or deny access to the inner components of the on-demand service environment 1200 based upon a set of rules and other criteria. The firewall 1216 may act as one or more of a packet filter, an application gateway, a stateful filter, a proxy server, or any other type of firewall.

In some embodiments, the core switches 1220 and 1224 are high-capacity switches that transfer packets within the on-demand service environment 1200. The core switches 1220 and 1224 may be configured as network bridges that quickly route data between different components within the on-demand service environment. In some embodiments, the use of two or more core switches 1220 and 1224 may provide redundancy and/or reduced latency.

In some embodiments, the pods 1240 and 1244 may perform the core data processing and service functions provided by the on-demand service environment. Each pod may include various types of hardware and/or software computing resources. An example of the pod architecture is discussed in greater detail with reference to FIG. 12B.

In some embodiments, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some embodiments, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some embodiments, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database root kits, and unauthorized information disclosure.

In some embodiments, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some embodiments, communication with the database storage system 1256 may be conducted via the database switch 1252. The multi-tenant database system 1256 may include more than one hardware and/or software components for handling database queries. Accordingly, the database switch 1252 may direct database queries transmitted by other components of the on-demand service environment (e.g., the pods 1240 and 1244) to the correct components within the database storage system 1256. In some embodiments, the database storage system 1256 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 12B shows a system diagram illustrating the architecture of the pod 1244, in accordance with one embodiment. The pod 1244 may be used to render services to a user of the on-demand service environment 1200. In some embodiments, each pod may include a variety of servers and/or other systems. The pod 1244 includes one or more content batch servers 1264, content search servers 1268, query servers 1272, file force servers 1276, access control system (ACS) servers 1280, batch servers 1284, and app servers 1288. Also, the pod 1244 includes database instances 1290, quick file systems (QFS) 1292, and indexers 1294. In one or more embodiments, some or all communication between the servers in the pod 1244 may be transmitted via the switch 1236.

In some embodiments, the application servers 1288 may include a hardware and/or software framework dedicated to the execution of procedures (e.g., programs, routines, scripts) for supporting the construction of applications provided by the on-demand service environment 1200 via the pod 1244. Some such procedures may include operations for providing the services described herein. The content batch servers 1264 may requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand service environment. The Fileforce servers 1276 may manage requests information stored in the Fileforce storage 1278. The Fileforce storage 1278 may store information such as documents, images, and basic large objects (BLOBs). By managing requests for information using the Fileforce servers 1276, the image footprint on the database may be reduced.

The query servers 1272 may be used to retrieve information from one or more file systems. For example, the query system 1272 may receive requests for information from the app servers 1288 and then transmit information queries to the NFS 1296 located outside the pod. The pod 1244 may share a database instance 1290 configured as a multi-tenant environment in which different organizations share access to the same database. Additionally, services rendered by the pod 1244 may require various hardware and/or software resources. In some embodiments, the ACS servers 1280 may control access to data, hardware resources, or software resources.

In some embodiments, the batch servers 1284 may process batch jobs, which are used to run tasks at specified times. Thus, the batch servers 1284 may transmit instructions to other servers, such as the app servers 1288, to trigger the batch jobs. For some embodiments, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some embodiments, one or more query servers 1272 may communicate with the NFS 1296 to retrieve and/or update information stored outside of the pod 1244. The NFS 1296 may allow servers located in the pod 1244 to access information to access files over a network in a manner similar to how local storage is accessed. In some embodiments, queries from the query servers 1222 may be transmitted to the NFS 1296 via the load balancer 1220, which may distribute resource requests over various resources available in the on-demand service environment. The NFS 1296 may also communicate with the QFS 1292 to update the information stored on the NFS 1296 and/or to provide information to the QFS 1292 for use by servers located within the pod 1244.

In some embodiments, the pod may include one or more database instances 1290. The database instance 1290 may transmit information to the QFS 1292. When information is transmitted to the QFS, it may be available for use by servers within the pod 1244 without requiring an additional database call. In some embodiments, database information may be transmitted to the indexer 1294. Indexer 1294 may provide an index of information available in the database 1290 and/or QFS 1292. The index information may be provided to file force servers 1276 and/or the QFS 1292.

Figure 13:
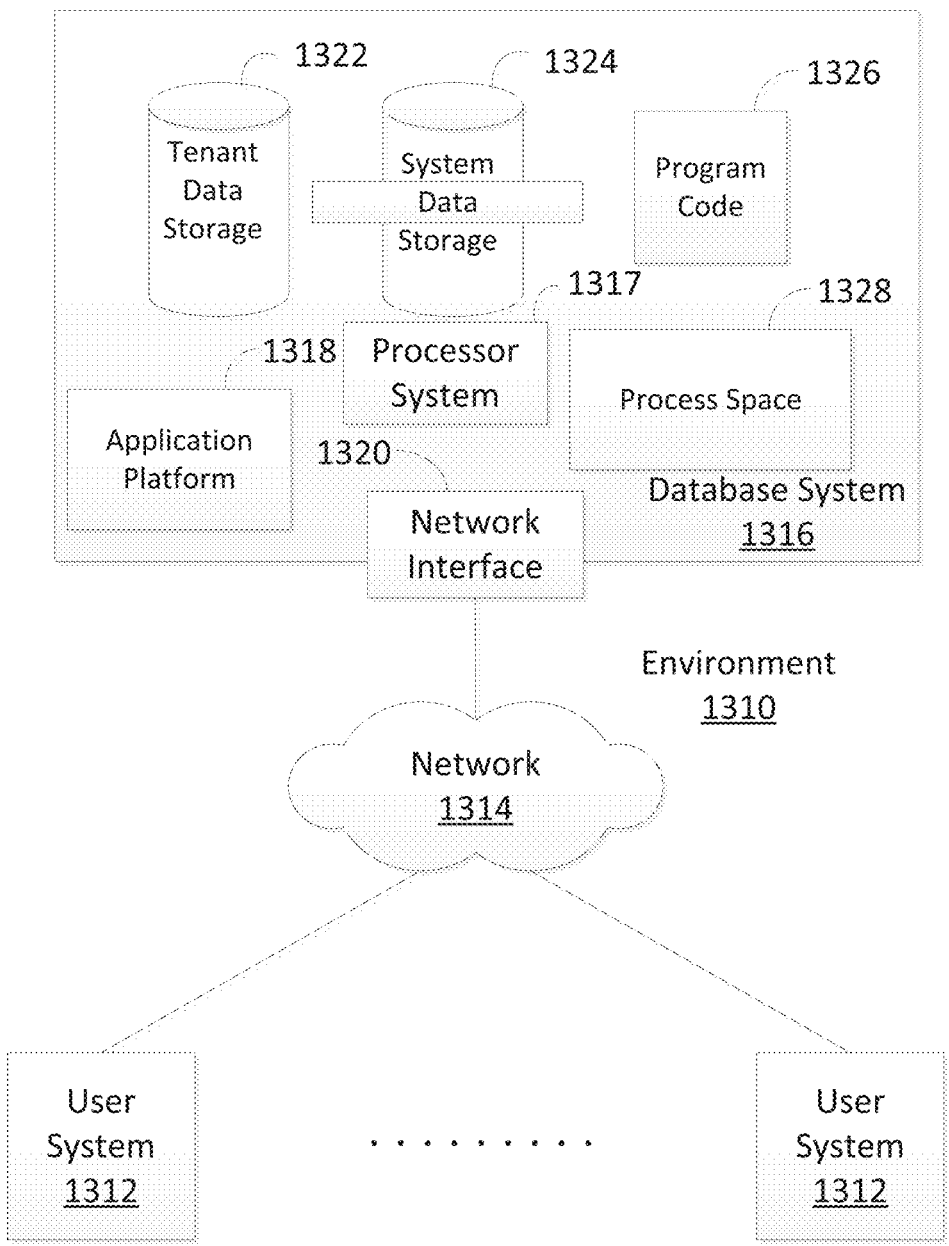
FIG. 13 shows a system diagram illustrating the architecture of a multi-tenant database environment, in accordance with some embodiments.
Figure 14:
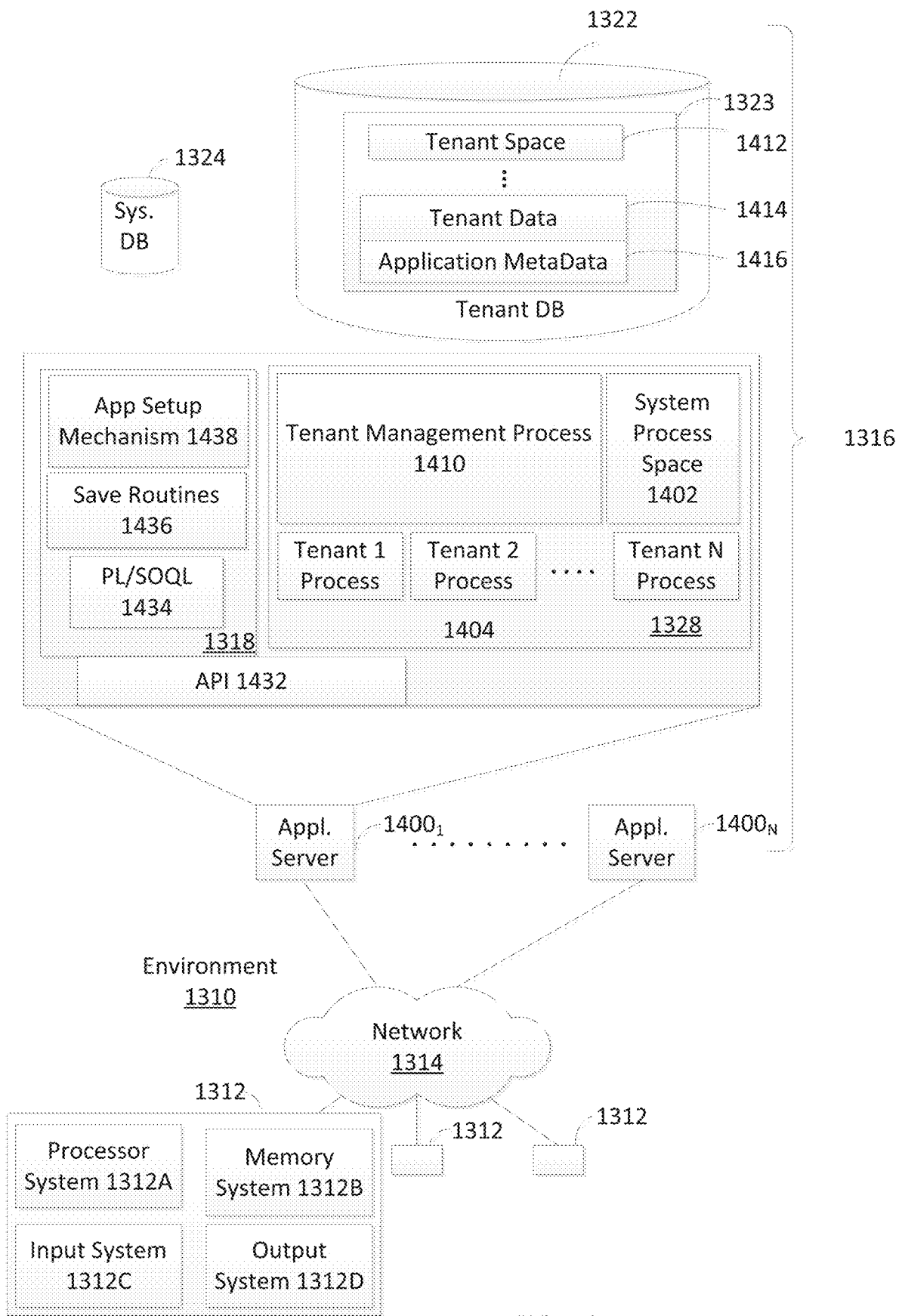
FIG. 14 shows a system diagram further illustrating the architecture of a multi-tenant database environment, in accordance with some embodiments.

FIG. 13 shows a block diagram of an environment 1310 wherein an on-demand database service might be used, in accordance with some embodiments. Environment 1310 includes an on-demand database service 1316. User system 1312 may be any machine or system that is used by a user to access a database user system. For example, any of user systems 1312 can be a handheld computing system, a mobile phone, a laptop computer, a work station, and/or a network of computing systems. As illustrated in FIGS. 13 and 14, user systems 1312 might interact via a network 1314 with the on-demand database service 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" will be used interchangeably herein. A database image may include one or more database objects. A relational database management system (RDBMS) or the equivalent may execute storage and retrieval of information against the database object(s). Application platform 1318 may be a framework that allows the applications of system 1316 to run, such as the hardware and/or software, e.g., the operating system. In an implementation, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

One arrangement for elements of system 1316 is shown in FIG. 13, including a network interface 1320, application platform 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

The users of user systems 1312 may differ in their respective capacities, and the capacity of a particular user system 1312 might be entirely determined by permissions (permission levels) for the current user. For example, where a call center agent is using a particular user system 1312 to interact with system 1316, the user system 1312 has the capacities allotted to that call center agent. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some embodiments, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 1316, shown in FIG. 13, implements a web-based customer relationship management (CRM) system. For example, in some embodiments, system 1316 includes application servers configured to implement and execute CRM software applications as well as provide related data, code, forms, web pages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications. User (or third party developer) applications, which may or may not include CRM, may be supported by the application platform 1318, which manages creation, storage of the applications into one or more database objects and executing of the applications in a virtual machine in the process space of the system 1316.

Each user system 1312 could include a desktop personal computer, workstation, laptop, PDA, cell phone, or any wireless access protocol (WAP) enabled device or any other computing system capable of interfacing directly or indirectly to the Internet or other network connection. User system 1312 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314.

Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 1316 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 1316 is configured to provide web pages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 14 also shows a block diagram of environment 1310 further illustrating system 1316 and various interconnections, in accordance with some embodiments. FIG. 14 shows that user system 1312 may include processor system 1312A, memory system 1312B, input system 1312C, and output system 1312D. FIG. 14 shows network 1314 and system 1316. FIG. 14 also shows that system 1316 may include tenant data storage 1322, tenant data 1323, system data storage 1324, system data 1325, User Interface (UI) 1430, Application Program Interface (API) 1432, PL/SOQL 1434, save routines 1436, application setup mechanism 1438, applications servers 1400₁-1400N, system process space 1402, tenant process spaces 1404, tenant management process space 1410, tenant storage area 1412, user storage 1414, and application metadata 1416. In other embodiments, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. Regarding user system 1312, processor system 1312A may be any combination of processors. Memory system 1312B may be any combination of one or more memory devices, short term, and/or long term memory. Input system 1312C may be any combination of input devices, such as keyboards, mice, trackballs, scanners, cameras, and/or interfaces to networks. Output system 1312D may be any combination of output devices, such as monitors, printers, and/or interfaces to networks. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1323 therein, and system data storage 1324 and the system data 1325 therein to serve requests of user systems 1312. The tenant data 1323 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as Oracle™ databases.

Application platform 1318 includes an application setup mechanism 1438 that supports application developers' creation and management of applications, which may be saved as metadata into tenant data storage 1322 by save routines 1436 for execution by subscribers as tenant process spaces 1404 managed by tenant management process 1410 for example. Invocations to such applications may be coded using PL/SOQL 34 that provides a programming language style interface extension to API 1432. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1416 for the subscriber making the invocation and executing the metadata as an application in a virtual machine.

Each application server 1400 may be communicably coupled to database systems, e.g., having access to system data 1325 and tenant data 1323, via a different network connection. For example, one application server 14001 might be coupled via the network 1314 (e.g., the Internet), another application server 1400N-1 might be coupled via a direct network link, and another application server 1400N might be coupled by yet a different network connection. Transfer Control Protocol and Internet Protocol (TCP/IP) are typical protocols for communicating between application servers 1400 and the database system. However, other transport protocols may be used to optimize the system depending on the network interconnect used.

In certain embodiments, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In some embodiments, therefore, an interface system implementing a load balancing function (e.g., an F5 Big-IP load balancer) is communicably coupled between the application servers 1400 and the user systems 1312 to distribute requests to the application servers 1400. In some embodiments, the load balancer uses a least connections algorithm to route user requests to the application servers 1400. Other examples of load balancing algorithms, such as round robin and observed response time, also can be used. For example, in certain embodiments, three consecutive requests from the same user could hit three different application servers 1400, and three requests from different users could hit the same application server 1400. In this manner, system 1316 is multi-tenant, wherein system 1316 handles storage of, and access to, different objects, data and applications across disparate users and organizations.

As an example of storage, one tenant might be a company that employs a sales force where each call center agent uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client machines/systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more SQL statements (e.g., SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method comprising:
   intercepting, by an executable application associated with a web browser on a computer system, contents of a web page to be displayed by the web browser during a user browsing system;
   parsing, by the executable application, the contents of the web page by applying a natural language processing algorithm, prior to display, to identify one or more references in the contents of web page to at least one business entity;
   determining, by the executable application, prior to display of the webpage, that a record field of a respective record matches the at least one business entity in the parsed contents of the web page, the respective record having been stored in the database prior to receipt of the contents of the web page, whether the at least one business entity is associated with at least one record stored in a database;
   causing, by the executable application, based on a determination that the at least one business entity is associated with the at least one record, the contents of the web page to be displayed by the browser with the one or more references highlighted and linked to the at least one record; and
   causing, by the executable application, an object to be displayed by the web browser in response to a user selection of the one or more highlighted references, the object including at least some information from the at least one record, stored in the database, associated with the at least one business entity, the object further including a link to the at least one record.

2. The method of claim 1, further comprising, for the user browsing session:
   receiving, by the executable application, authentication information from a user;
   transmitting, by the executable application, the authentication information to the database; and
   receiving, by the executable application, a confirmation of authentication of the user from the database.

3. The method of claim 1, wherein the object to be displayed by the web browser is a display window separate from the web page being displayed by the web browser.

4. The method of claim 1, further comprising:
   receiving, by the executable application, a selection of the link to the at least one record; and
   causing, by the executable application, a second object to be displayed by the web browser, the second object including at least some additional information about the at least one business entity associated with the at least one record.

5. The method of claim 1, further comprising:
receiving, by the executable application, a second user selection of a reference to a business entity not highlighted or linked to the at least one record stored in the database from the contents of the web page being displayed by the browser;
retrieving, by the executable application, in response to receiving the second user selection, information associated with the business entity from a third-party information source; and
causing, by the executable application, a second object to be displayed by the web browser in response to the second user selection, the second object including at least some of the retrieved information associated with the business entity from the third-party information source.

6. The method of claim 1, further comprising:
generating, by the executable application, reference highlighting data for the web page, the reference highlighting data comprising instructions for modifying a visual appearance of at least one display occurrence of the at least one business entity in the contents of the web page.

7. A system comprising:
one or more processors; and
a non-transitory computer readable medium storing a plurality of instructions, which when executed, cause the one or more processors to:
intercept, by an executable application associated with a web browser on a computer system, contents of a web page to be displayed by the web browser during a user browsing system;
parse, by the executable application, the contents of the web page by applying a natural language processing algorithm, prior to display, to identify one or more references in the contents of web page to at least one business entity;
determine, by the executable application, prior to display of the webpage, that a record field of a respective record matches the at least one business entity in the parsed contents of the web page, the respective record having been stored in the database prior to receipt of the contents of the web page, whether the at least one business entity is associated with at least one record stored in a database;
cause, by the executable application, based on a determination that the at least one business entity is associated with the at least one record, the contents of the web page to be displayed by the browser with the one or more references highlighted and linked to the at least one record in the database; and
cause, by the executable application, an object to be displayed by the web browser in response to a user selection of the one or more highlighted references, the object including at least some information from the at least one record, stored in the database, associated with the at least one business entity, the object further including a link to the at least one record.

8. The system of claim 7, wherein the plurality of instructions, when executed, further cause the one or more processors to:
generate, by the executable application, reference highlighting data for the web page, the reference highlighting data comprising instructions for modifying a visual appearance of at least one display occurrence of the at least one business entity in the contents of the web page.

9. The system of claim 7, wherein the plurality of instructions, when executed, further cause the one or more processors to:
receive, by the executable application, authentication information from a user;
transmit, by the executable application, the authentication information to the database; and
receive, by the executable application, a confirmation of authentication of the user from the database.

10. The system of claim 7, wherein the object to be displayed by the web browser is a display window separate from the web page being displayed by the web browser.

11. The system of claim 7, wherein the plurality of instructions, when executed, further cause the one or more processors to:
receive, by the executable application, a selection of the link to the at least one record; and
cause, by the executable application, a second object to be displayed by the web browser, the second object including at least some additional information about the at least one business entity associated with the at least one record.

12. The system of claim 7, wherein the plurality of instructions, when executed, further cause the one or more processors to:
receive, by the executable application, a second user selection of a reference to a business entity that lacks association with at least one record stored in the database, the reference to a business entity not being highlighted or linked to the at least one record stored in the database within the contents of the web page being displayed by the browser;
in response to receiving the second user selection, retrieve, by the executable application, information associated with the business entity from a third-party information source; and
cause, by the executable application, a second object to be displayed by the web browser in response to the second user selection, the second object including at least some of the retrieved information associated with the business entity from the third-party information source.

13. The system of claim 7, wherein the executable application is activated based on a first user input and the executable application is deactivated based on a second user input.

14. A computer program product comprising a non-transitory computer-readable medium having a computer-readable program code embodied therein, the computer-readable program code being executed by one or more processors, the program code including instructions to:
intercept, by an executable application associated with a web browser on a computer system, contents of a web page to be displayed by the web browser during a user browsing system;
parse, by the executable application, the contents of the web page by applying a natural language processing algorithm, prior to display, to identify one or more references in the contents of web page to at least one business entity;
determine, by the executable application, prior to display of the webpage, that a record field of a respective record matches the at least one business entity in the parsed contents of the web page, the respective record having been stored in the database prior to receipt of the contents of the web page, whether the at least one business entity is associated with at least one record stored in a database;

cause, by the executable application, based on a determination that the at least one business entity is associated with the at least one record, the contents of the web page to be displayed by the browser with the one or more references highlighted and linked to the at least one record in the database; and cause, by the executable application, an object to be displayed by the web browser in response to a user selection of the one or more highlighted references, the object including at least some information from the at least one record, stored in the database, associated with the at least one business entity, the object further including a link to the at least one record.

15. The computer program product of claim 14, further including instructions to:

generate, by the executable application, reference highlighting data for the web page, the reference highlighting data comprising instructions for modifying a visual appearance of at least one display occurrence of the at least one business entity in the contents of the web page.

16. The computer program product of claim 14, further including instructions to:

receive, by the executable application, authentication information from a user for a user browsing session;

transmit, by the executable application, the authentication information to the database; and receive, by the executable application, a confirmation of authentication of the user from the database.

17. The computer program product of claim 14, further including instructions to:

receive, by the executable application, a selection of the link to the at least one record; and cause, by the executable application, a second object to be displayed by the web browser, the second object including at least some additional information about the at least one business entity associated with the at least one record.

18. The computer program product of claim 14, further including instructions to:

receive, by the executable application, a second user selection of a reference to a business entity that lacks association with at least one record stored in the database, the reference to a business entity not being highlighted or linked to the at least one record stored in the database within the contents of the web page being displayed by the browser;

in response to receiving the second user selection, retrieve, by the executable application, information associated with the business entity from a third-party information source; and cause, by the executable application, a second object to be displayed by the web browser in response to the second user selection, the second object including at least some of the retrieved information associated with the business entity from the third-party information source.

19. The computer program product of claim 14, wherein the executable application is activated based on a first user input and the executable application is deactivated based on a second user input.

* * * * *